(12) United States Patent
Cole et al.

(10) Patent No.: US 12,135,083 B2
(45) Date of Patent: Nov. 5, 2024

(54) HYDRAULIC PARK-BY-WIRE SHIFT SYSTEMS, TRANSMISSIONS INCORPORATING THE SAME, AND METHODS FOR TRANSMISSIONS

(71) Applicant: ALLISON TRANSMISSION, INC., Indianapolis, IN (US)

(72) Inventors: Jeffrey J. Cole, Pittsboro, NC (US); Charles F. Long, Zionsville, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 18/115,312

(22) Filed: Feb. 28, 2023

(65) Prior Publication Data

US 2024/0288071 A1    Aug. 29, 2024

(51) Int. Cl.
*F16H 63/34*    (2006.01)
*F16H 61/02*    (2006.01)

(52) U.S. Cl.
CPC ..... *F16H 63/3483* (2013.01); *F16H 61/0206* (2013.01)

(58) Field of Classification Search
CPC ............. F16H 63/3483; F16H 61/0206; F16H 63/3458; F16H 63/3433
See application file for complete search history.

(56) References Cited

U.S. PATENT DOCUMENTS

| | | | |
|---|---|---|---|
| 1,261,967 A | 4/1918 | Stoltze | |
| 7,284,648 B2 | 10/2007 | Reed et al. | |
| 9,856,980 B2 * | 1/2018 | Tachibanada | F15B 1/027 |
| 10,443,723 B2 | 10/2019 | Bormann | |
| 10,619,738 B2 * | 4/2020 | Gollmer | F16H 61/0206 |
| 10,648,560 B2 | 5/2020 | Kokubu et al. | |
| 11,273,802 B2 | 3/2022 | Hanker et al. | |
| 2004/0248687 A1 * | 12/2004 | Powell | F16H 63/3483 475/132 |
| 2007/0191182 A1 * | 8/2007 | Koski | F16H 59/08 477/96 |
| 2007/0284213 A1 * | 12/2007 | Duhaime | F16H 63/483 192/222 |
| 2009/0038430 A1 * | 2/2009 | Itazu | F16H 63/3458 74/503 |
| 2010/0269620 A1 * | 10/2010 | Kim | F16H 63/3483 74/473.24 |
| 2011/0011583 A1 * | 1/2011 | Niconoff | E21B 49/10 210/450 |

(Continued)

FOREIGN PATENT DOCUMENTS

| | | |
|---|---|---|
| CN | 111868420 A | 10/2020 |
| DE | 102019134730 A1 | 6/2021 |

(Continued)

*Primary Examiner* — Jacob S. Scott
*Assistant Examiner* — Farhana Pervin
(74) *Attorney, Agent, or Firm* — Taft Stettinius & Hollister LLP; Stephen F. Rost

(57) ABSTRACT

Transmissions, park systems, and methods of operating transmissions are disclosed. A transmission includes an input shaft to receive torque from a drive unit, an output shaft to transmit torque to a load, and a park system to selectively brake the output shaft. The park system includes a park gear assembly, an actuator valve, and an actuation linkage coupled between the actuator valve and the park gear assembly.

18 Claims, 12 Drawing Sheets

(56) References Cited

U.S. PATENT DOCUMENTS

| | | | | |
|---|---|---|---|---|
| 2014/0346004 | A1* | 11/2014 | Landino | F16H 63/3433 |
| | | | | 192/219.5 |
| 2015/0159752 | A1* | 6/2015 | Popp | F16H 63/3458 |
| | | | | 192/219.4 |
| 2016/0341311 | A1* | 11/2016 | Watanabe | F16H 63/3483 |
| 2017/0130794 | A1* | 5/2017 | Spaulding | B60T 7/104 |
| 2017/0268673 | A1* | 9/2017 | Ishikawa | B60T 13/20 |
| 2017/0370468 | A1* | 12/2017 | Herrmann | B60T 1/062 |
| 2018/0149268 | A1* | 5/2018 | Nakade | B60K 6/547 |
| 2018/0172154 | A1* | 6/2018 | Nakai | F16H 63/3458 |
| 2019/0120375 | A1* | 4/2019 | Herrmann | F16H 63/48 |
| 2020/0096101 | A1* | 3/2020 | Kasami | B60T 1/005 |
| 2020/0149631 | A1* | 5/2020 | Tachibanada | B60T 1/005 |
| 2020/0182353 | A1* | 6/2020 | Klein | F16H 21/44 |
| 2020/0248806 | A1 | 8/2020 | Klein | |
| 2020/0355267 | A1* | 11/2020 | Puiu | F16H 63/3425 |
| 2020/0362964 | A1* | 11/2020 | Liang | F16H 63/3425 |
| 2021/0116026 | A1* | 4/2021 | Weinl | F16H 63/36 |
| 2021/0270363 | A1* | 9/2021 | Tomita | F16H 59/74 |
| 2021/0381593 | A1* | 12/2021 | Greb | F16H 63/3416 |
| 2021/0396310 | A1 | 12/2021 | Kraemer et al. | |
| 2021/0396311 | A1 | 12/2021 | Greb et al. | |
| 2021/0396312 | A1* | 12/2021 | Petersson | B60T 1/005 |

FOREIGN PATENT DOCUMENTS

| | | |
|---|---|---|
| DE | 102020116983 A1 | 12/2021 |
| DE | 102020209016 A1 | 1/2022 |
| DE | 102020209726 A1 | 2/2022 |
| DE | 102020122693 A1 | 3/2022 |
| DE | 102020126399 A1 | 4/2022 |
| DE | 102020212584 A1 | 4/2022 |
| DE | 102021114251 A1 | 4/2022 |
| JP | 2011011579 A | 1/2011 |

* cited by examiner

HYDRAULIC PARK-BY-WIRE SHIFT SYSTEMS, TRANSMISSIONS INCORPORATING THE SAME, AND METHODS FOR TRANSMISSIONS

FIELD OF THE DISCLOSURE

The present disclosure relates, generally, to park systems, and, more specifically, to electro-hydraulic park systems of transmissions.

BACKGROUND

One or more park systems may be incorporated into a transmission to selectively brake one or more components of the transmission and thereby provide a park operating mode of the transmission. Systems, devices, and/or methods that avoid drawbacks associated with existing park systems remain an area of interest.

SUMMARY

The present disclosure may comprise one or more of the following features and combinations thereof.

According to one aspect of the present disclosure, a transmission may include an input shaft to receive torque from a drive unit, an output shaft to transmit torque to a load, and a park system to selectively brake the output shaft. The park system may include a park gear assembly, an actuator valve, and an actuation linkage. The actuator valve may have a valve element axially translatable along a first longitudinal axis in response to one or more fluid pressures applied thereto. The actuation linkage may be coupled between the actuator valve and the park gear assembly such that translation of the valve element along the first longitudinal axis drives operation of the park gear assembly through the actuation linkage in (i) an engaged state, in which the park system resists rotation of the output shaft, and (ii) a disengaged state, in which the park system permits rotation of the output shaft. The actuation linkage may include a plate pivotally coupled to the valve element such that movement of the valve element along the first longitudinal axis causes rotation of the plate about a first rotational axis. The plate may include a body that surrounds the first rotational axis and is formed to include a plurality of notches along an outermost edge thereof. The plate may include a mount extension appended to the body that extends outwardly away from the body and is formed to include a slot that extends through one end thereof and is disposed between two mount arms pivotally coupled to the valve element.

In some embodiments, the mount extension of the plate may be pivotally coupled to the valve element of the actuator valve for rotation about a second rotational axis, and the first rotational axis and the second rotational axis may be spaced from one another in a direction parallel to the first longitudinal axis. The mount extension and the body of the plate may define distinct structures spaced from one another in the direction.

In some embodiments, the actuation linkage may include a rod pivotally coupled to the body of the plate that is adapted for translation along a second longitudinal axis spaced from the first longitudinal axis. The first longitudinal axis may be arranged parallel to the second longitudinal axis.

In some embodiments, the park system may include a position sensor to generate a signal indicative of a position of the valve element along the first longitudinal axis. Additionally, in some embodiments, the valve element of the actuator valve may be formed to include a first annular groove at an outer periphery thereof and a second annular groove at the outer periphery, and the first annular groove and the second annular groove may be spaced from one another along the first longitudinal axis. The park system may include a locking pin for positioning in the first annular groove or the second annular groove to block translation of the valve element along the first longitudinal axis, the locking pin may be positioned in one of the first annular groove and the second annular groove when the park system is in the engaged state, and the locking pin may be positioned in the other of the first annular groove and the second annular groove when the park system is in the disengaged state.

In some embodiments, the park system may include a first pressure control solenoid to supply a first hydraulic fluid pressure to the actuator valve to drive operation of the park system in the engaged state. The park system may include a second pressure control solenoid to supply a second hydraulic fluid pressure to the actuator valve to drive operation of the park system in the disengaged state, and the first hydraulic fluid pressure may be different from the second hydraulic fluid pressure.

According to another aspect of the present disclosure, a park system to selectively brake an output shaft of a transmission may include a park gear assembly, an actuator valve, and an actuation linkage. The actuator valve may have a valve element axially translatable along a first longitudinal axis in response to one or more fluid pressures applied thereto. The actuation linkage may be coupled between the actuator valve and the park gear assembly such that translation of the valve element along the first longitudinal axis drives operation of the park gear assembly through the actuation linkage in (i) an engaged state, in which the park system resists rotation of the output shaft, and (ii) a disengaged state, in which the park system permits rotation of the output shaft. The actuation linkage may include a plate pivotally coupled to the valve element such that movement of the valve element along the first longitudinal axis causes rotation of the plate about a first rotational axis. The plate may include a body that surrounds the first rotational axis and is formed to include a plurality of notches along an outermost edge thereof. The plate may include a mount extension appended to the body that has a slot defined between two mount arms pivotally coupled to the valve element. The plurality of notches and the slot may be spaced from one another in a direction parallel to the first longitudinal axis.

In some embodiments, the mount extension of the plate may be pivotally coupled to the valve element of the actuator valve for rotation about a second rotational axis, and the first rotational axis and the second rotational axis may be spaced from one another in the direction. The mount extension and the body of the plate define distinct structures spaced from one another in the direction.

In some embodiments, the actuation linkage may include a rod pivotally coupled to the body of the plate that is adapted for translation along a second longitudinal axis spaced from the first longitudinal axis. The first longitudinal axis may be arranged parallel to the second longitudinal axis.

In some embodiments, the park system may include a position sensor to generate a signal indicative of a position of the valve element along the first longitudinal axis. Additionally, in some embodiments, the valve element of the actuator valve may be formed to include a first annular groove at an outer periphery thereof and a second annular groove at the outer periphery, and the first annular groove and the second annular groove may be spaced from one another along the first longitudinal axis. The park system may include a locking pin for positioning in the first annular groove or the second annular groove to block translation of the valve element along the first longitudinal axis, the locking pin may be positioned in one of the first annular groove and the second annular groove when the park system is in the engaged state, and the locking pin may be positioned in the other of the first annular groove and the second annular groove when the park system is in the disengaged state.

In some embodiments, the park system may include a first pressure control solenoid to supply a first hydraulic fluid pressure to the actuator valve to drive operation of the park system in the engaged state and a second pressure control solenoid to supply a second hydraulic fluid pressure to the actuator valve to drive operation of the park system in the disengaged state, and the first hydraulic fluid pressure may be different from the second hydraulic fluid pressure.

According to yet another aspect of the present disclosure, a park system to selectively brake an output shaft of a transmission may include a park gear assembly, an actuator valve, and an actuation linkage. The actuator valve may have a valve element axially translatable along a first longitudinal axis in response to one or more fluid pressures applied thereto. The actuation linkage may be coupled between the actuator valve and the park gear assembly such that translation of the valve element along the first longitudinal axis drives operation of the park gear assembly through the actuation linkage in (i) an engaged state, in which the park system resists rotation of the output shaft, and (ii) a disengaged state, in which the park system permits rotation of the output shaft. The actuation linkage may include a plate pivotally coupled to the valve element such that movement of the valve element along the first longitudinal axis causes rotation of the plate about a first rotational axis. The plate may include a body that surrounds the first rotational axis and is formed to include a plurality of notches along an outermost edge thereof. The actuation linkage may include a rod pivotally coupled to the body of the plate that is adapted for translation along a second longitudinal axis spaced from the first longitudinal axis. The first longitudinal axis may be arranged parallel to the second longitudinal axis.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
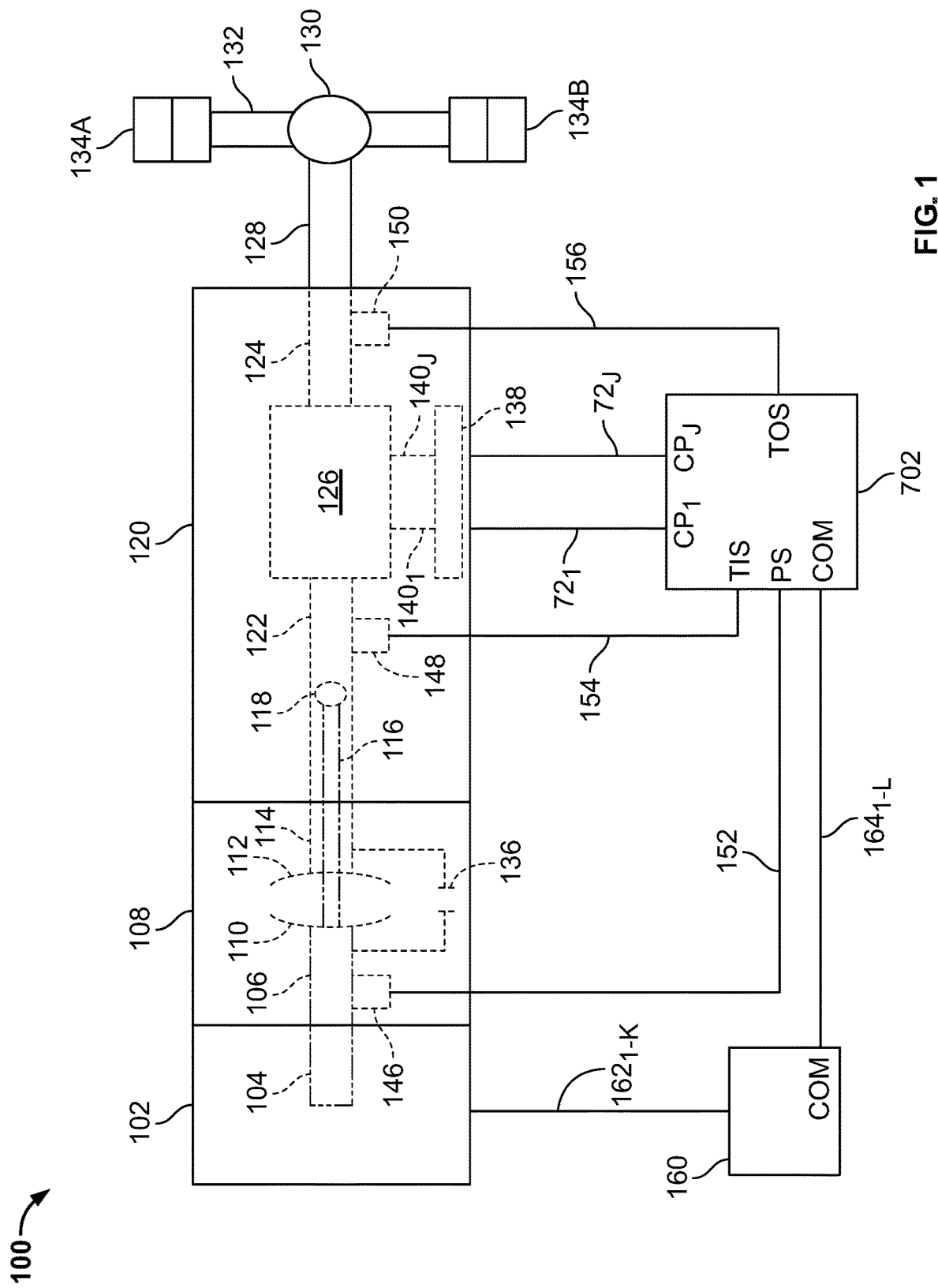
FIG. 1 is a diagrammatic view of a drive system for a vehicle incorporating a transmission.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java™, C++™, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative drive system 100 for a vehicle includes a transmission 120. The transmission 120 is configured to receive rotational power supplied by a drive unit 102 and provide the rotational power to an illustrative load (e.g., an axle 132 and wheels 134A, 134B mounted thereto) in use thereof. The transmission 120 includes an input shaft 122, an output shaft 124, and a park system 200 (see FIG. 2). The input shaft 122 includes, or is otherwise embodied as, any structure or collection of structures configured to receive torque/rotational power from the drive unit 102. The output shaft 124 includes, or is otherwise embodied as, any structure or collection of structures configured to transmit torque/rotational power from the input shaft 122 to a load, which, in addition to the axle 132 and the wheels 134A, 134B, may include one or more transaxles, differentials, transfer boxes, final drives, and/or wheels, for example. As discussed below, the park system 200 includes at least one component in direct contact with the output shaft 124. As will be apparent from the discussion that follows, the park system 200 is configured to selectively brake the output shaft 124 during a park operational mode of the transmission 120.

Figure 2:
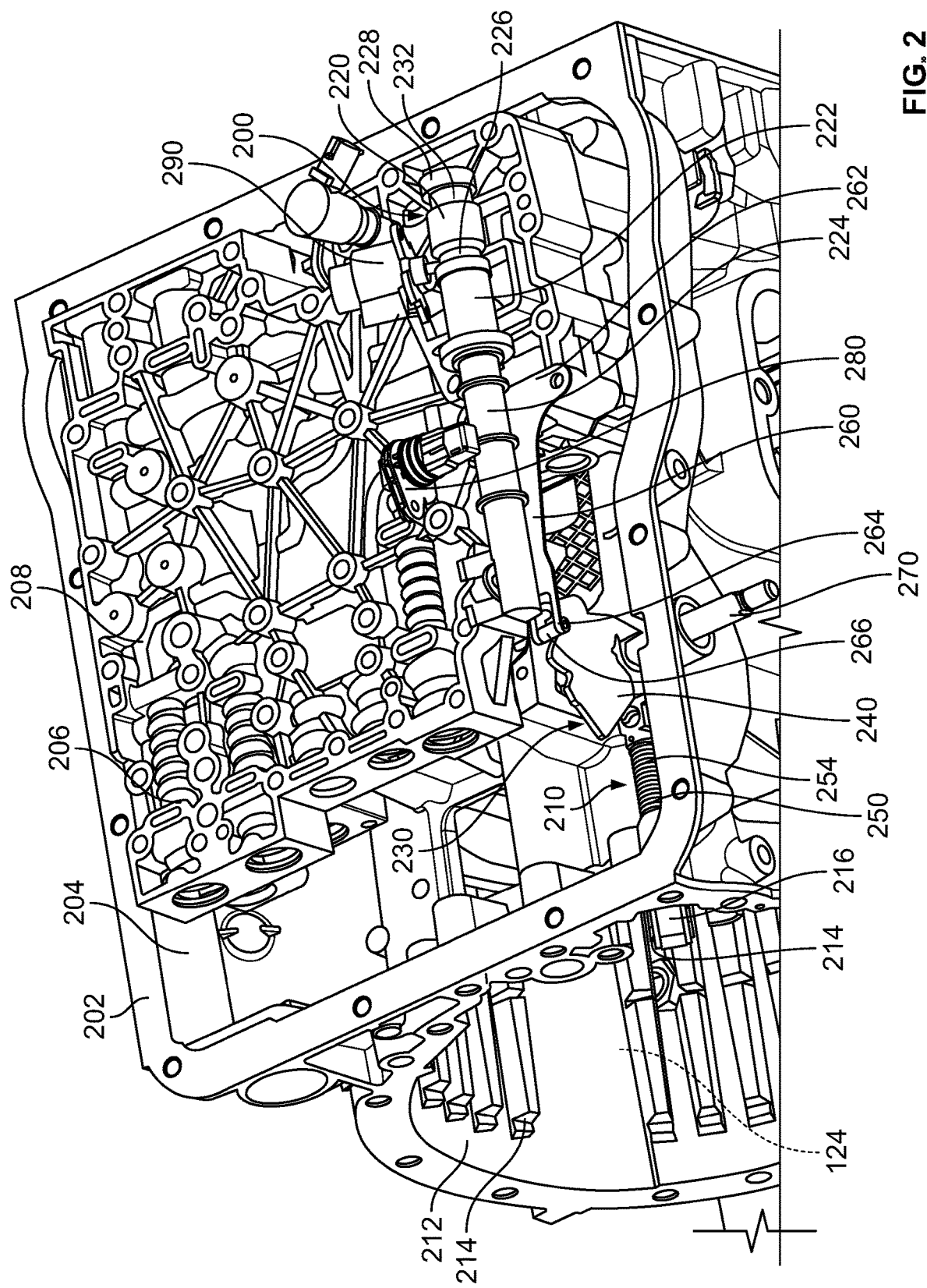
FIG. 2 is a partial perspective view of a park system adapted for inclusion in the drive system of FIG. 1.

Referring now to FIG. 2, the illustrative park system 200 includes a park gear assembly 210. Among other things, the park gear assembly 210 includes a component (e.g., a gear 212) arranged in contact with the output shaft 124 as indicated in FIG. 2. In some embodiments, the gear 212 receives the output shaft 124 such that inner teeth or splines 214 of the gear 212 mate or mesh with corresponding features (e.g., grooves, notches, recesses, channels, or the like) of the output shaft 124. In any case, it should be appreciated that complementary features of the gear 212 and the output shaft 124 couple the gear 212 and the output shaft 124 for common rotation and/or lack thereof.

The illustrative park system 200 includes an actuator valve 220 coupled to the park gear assembly 210. The actuator valve 220 includes, or is otherwise embodied as, any device or collection of devices having a valve element 222 that is movable in response to one or more fluid pressures applied thereto. Therefore, in the illustrative embodiment, the actuator valve 220 includes, or is otherwise embodied as, a hydraulic actuator valve configured to convert fluid pressure into linear motion (e.g., of the valve element 222).

Figure 3:
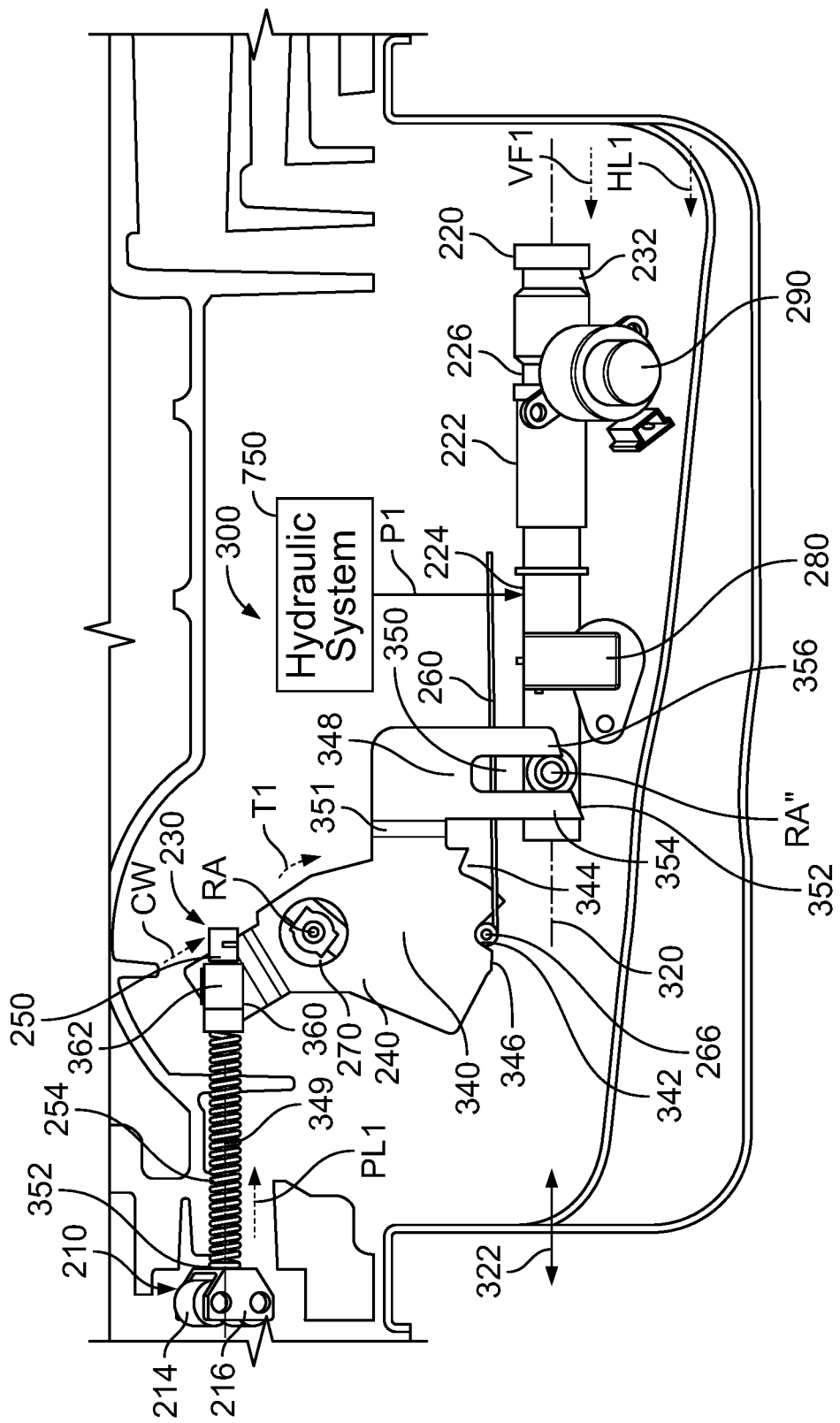
FIG. 3 is an elevation view of various components of the park system of FIG. 2 in an engaged state thereof.
Figure 4:
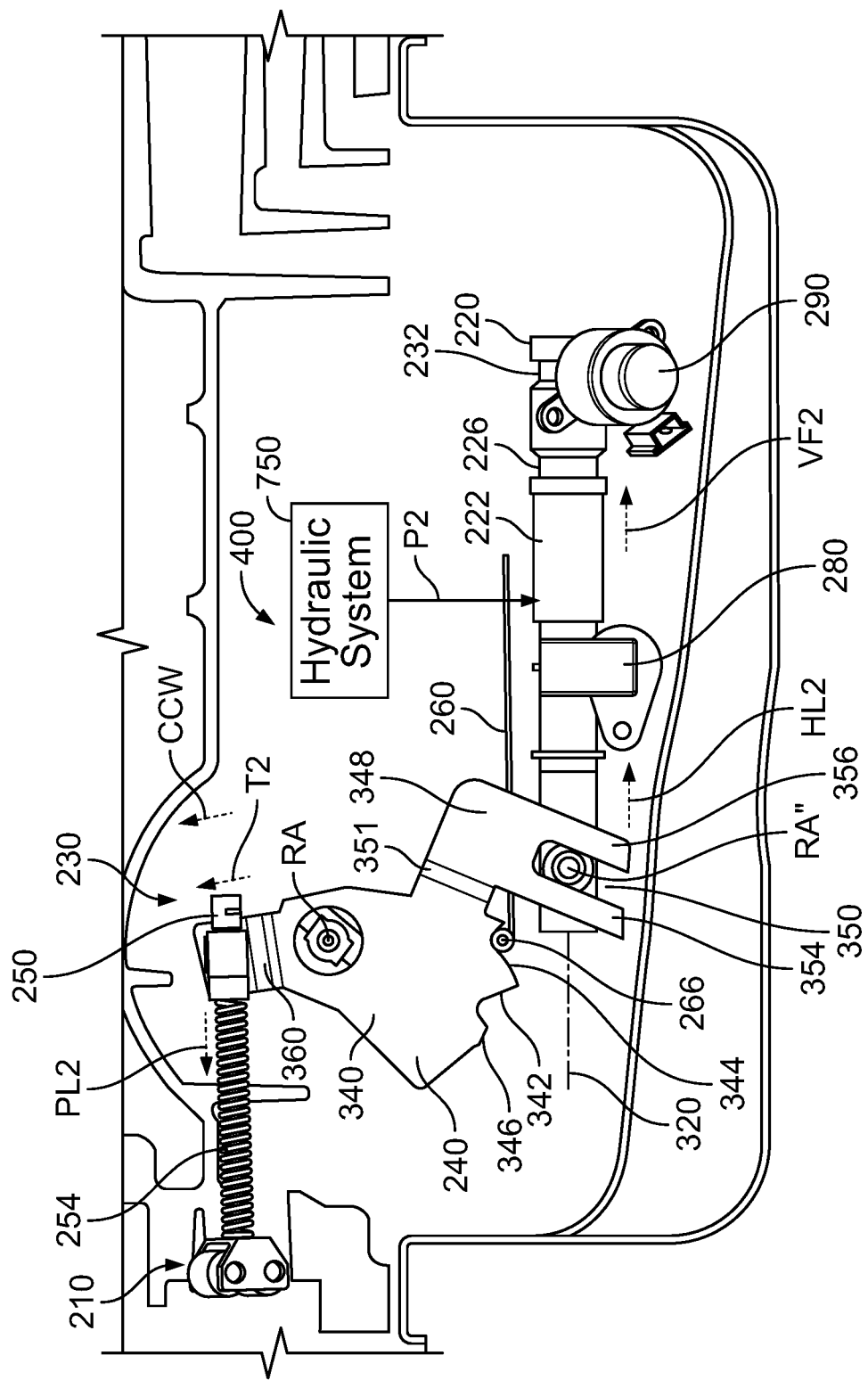
FIG. 4 is an elevation view of the park system similar to FIG. 3 in a disengaged state thereof.

As best seen in FIGS. 3 and 4, the valve element 222 of the actuator valve 220 is axially translatable along a longitudinal axis 320 in response to one or more fluid pressures applied thereto. In some embodiments, the valve element 222 includes, or is otherwise embodied as, a spool 224 having a plurality of discrete sections or lands. The sections or lands may each have the same diameter, at least in some cases. In other cases, the sections or lands may have different diameters. Further, in some embodiments, each of the sections or lands may cooperate with another element of the actuator valve 220 (e.g., a housing or case at least partially surrounding the valve element 222) to define one or more fluid chambers of the actuator valve 220 configured to receive fluid (e.g., hydraulic fluid).

The park system 200 illustratively includes an actuation linkage 230 coupled between the actuator valve 220 and the park gear assembly 210. As described in further detail below, the actuation linkage 230 includes a number of mechanical and/or electromechanical structures that cooperate to operatively couple the actuator valve 220 to the park gear assembly 210. Consequently, in use of the transmission 120, the actuator valve 220 drives operation of the park gear assembly 210 through the actuation linkage 230 to establish a plurality of operating states of the park gear assembly 210. In particular, through the coupling established by the actuation linkage 230, translation of the valve element 222 along the longitudinal axis 320 drives operation of the park gear assembly 210 in an engaged state 300 (see FIG. 3) and in a disengaged state 400 (see FIG. 4), which are further discussed below. In the engaged state 300, the park system 200 constrains rotation of the gear 212 to resist rotation of the output shaft 124. In the disengaged state 400, the park system 200 allows rotation of the gear 212 to permit rotation of the output shaft 124.

In the illustrative embodiment, the actuation linkage 230 includes a plate 240 pivotally coupled to the valve element 222 of the actuator valve 220, as best seen in FIGS. 3 and 4. As described below with reference to those figures, the plate 240 is pivotally coupled to the valve element 222 such that movement of the valve element 222 along the longitudinal axis 320 causes rotation of the plate 240 about a rotational axis RA. The plate 240 includes a body 340 (see FIG. 3) and a mount extension 348 appended to the body 340.

The body 340 and the mount extension 348 are illustratively formed as separate and distinct structures of the plate 240. In some embodiments, the body 340 and the mount extension 348 may be interconnected structures of the plate 240 that are formed separately. Additionally, in some embodiments, the body 340 and the mount extension 348 may be integrally formed together as a single piece and/or as a unitary structure of the plate 240. In any case, the body 340 surrounds the rotational axis RA and is formed to include notches 342, 344 along an outermost edge 346 thereof. The mount extension 348 is appended to the body 340 such that the mount extension 348 extends outwardly away from the body 340. The mount extension 348 is formed to include a slot 350 that extends through one end 352 thereof and is disposed between mount arms 354, 356 pivotally coupled to the valve element 222. The notches 342, 344 and the slot 350 are spaced from one another in a direction parallel to the longitudinal axis 320.

The park system 200 of the present disclosure relies on a hydraulic system 750 (see FIG. 7) including the actuator valve 220 and other devices discussed below to drive operation of the park gear assembly 210 in the aforementioned operational states. In some embodiments, the hydraulic system 750 may be employed as a substitute or replacement for a cable-actuated parking mechanism. In such embodiments, it should be appreciated that a cable-actuated parking mechanism may be omitted entirely. In other embodiments, the hydraulic system 750 may be employed in conjunction with a cable-actuated parking mechanism to provide redundant mechanisms for driving operation of the park gear assembly 210.

In the illustrative embodiment, the transmission 120 includes a control system 700 (see FIG. 7) that is configured to control operation of various components of the transmission 120 (e.g., one or more clutches and an electro-hydraulic system 138) and operation of the park system 200 (e.g., the actuator valve 220 and various other devices included in the hydraulic system 750). The control system 700 includes a controller 702 that is communicatively coupled to various electromechanical components of the park system 200, among other things. Methods and/or activities that may be performed by the controller 702 to control operation of the park system 200 are described in greater detail below with reference to FIGS. 8-10.

Referring again to FIG. 1, it should be appreciated that the illustrative transmission 120, and the drive system 100 incorporating the transmission 120, are adapted for use in one or more vehicles employed in a variety of applications. In some embodiments, the transmission 120 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the transmission 120 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, the transmission 120 includes one or more clutches (not shown). The one or more clutches may be included in, or otherwise adapted for use with, the electro-hydraulic system 138 and coupled between the input shaft 122 and the output shaft 124 to selectively transmit rotational power between the shafts 122, 124 in one or more operating modes of the transmission 120. Each of the one or more clutches may be selectively engageable in response to one or more fluid pressures applied thereto.

In the illustrative embodiment, the drive unit 102 is embodied as, or otherwise includes, any device capable of producing rotational power to drive other components (e.g., a torque converter 108 and the transmission 120) of the drive system 100 in use thereof. In some embodiments, the drive unit 102 may be embodied as, or otherwise include, an internal combustion engine, diesel engine, electric motor, or other power-generating device. In any case, the drive unit 102 is configured to rotatably drive an output shaft 104 that is coupled to an input or pump shaft 106 of a torque converter 108.

The input or pump shaft 106 of the illustrative torque converter 108 is coupled to an impeller or pump 110 that is rotatably driven by the output shaft 104 of the drive unit 102. The torque converter 108 further includes a turbine 112 that is coupled to a turbine shaft 114. In the illustrative embodiment, the turbine shaft 114 is coupled to, or integral with, the input shaft 122 of the transmission 120.

The illustrative torque converter 108 also includes a lockup clutch 136 connected between the pump 110 and the turbine 112 of the torque converter 108. The torque converter 108 is operable in a so-called "torque converter" mode during certain operating conditions, such as during vehicle launch, low speed conditions, and certain gear shifting conditions, for example. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to more torque than is being supplied by the drive unit 102. The torque converter 108 is alternatively operable in a so-called "lockup" mode during other operating conditions, such as when torque multiplication is not needed, for example. In the lockup mode, the lockup clutch 136 is engaged and the pump 110 is thereby secured directly to the turbine 112 so that the drive unit output shaft 104 is directly coupled to the input shaft 124 of the transmission 118 through the torque converter 108.

In the illustrative embodiment, the transmission 120 includes an internal pump 118 configured to pressurize, and/or distribute fluid toward, one or more fluid (e.g., hydraulic fluid) circuits thereof. In some embodiments, the pump 118 may be configured to pressurize, and/or distribute fluid toward, a main circuit, a lube circuit, an electro-hydraulic control circuit, and/or any other circuit incorporated into the electro-hydraulic system 138, for example. It should be appreciated that in some embodiments, the pump 118 may be driven by a shaft 116 that is coupled to the output shaft 104 of the drive unit 102. In this arrangement, the drive unit 102 can deliver torque to the shaft 116 for driving the pump 118 and building pressure within the different circuits of the transmission 120.

The illustrative transmission 120 includes a gearing system 126 coupled between the input shaft 122 and the output shaft 124. It should be appreciated that the gearing system 126 may include one or more gear arrangements (e.g., planetary gear arrangements, epicyclic drive arrangements, etc.) that provide, or are otherwise associated with, one or more gear ratios. When used in combination with the one or more clutches and the electro-hydraulic system 138 under control by the control system 700, the gearing system 126 may provide, or otherwise be associated with, one or more operating ranges selectable by an operator.

The output shaft 124 of the transmission 120 is illustratively coupled to, or otherwise integral with, a propeller shaft 128. The propeller shaft 128 is coupled to a universal joint 130 which is coupled to, and rotatably drives, the axle 132 and the wheels 134A, 134B. In this arrangement, the output shaft 124 drives the wheels 134A, 134B through the propeller shaft 128, the universal joint 130, and the axle 132 in use of the drive system 100. Of course, it should be appreciated that, in other embodiments, the output shaft 124 may drive the wheels 134A, 134B through another suitable mechanism and/or collection of structures.

The illustrative transmission 120 includes the electro-hydraulic system 138 that is fluidly coupled to the gearing system 126 via a number (i.e., J) of fluid paths $140_1$-$140_J$, where J may be any positive integer. The electro-hydraulic system 138 is configured to receive control signals provided by various electro-hydraulic control devices (not shown), such as one or more sensors and one or more flow and/or pressure control devices, for example. In response to those control signals, and under control by the control system 700, the electro-hydraulic system 138 selectively causes fluid to flow through one or more of the fluid paths $140_1$-$140_J$ to control operation (e.g., engagement and disengagement) of one or more friction devices (e.g., the one or more clutches) included in, or otherwise adapted for use with, the gearing system 126.

Of course, it should be appreciated that the one or more friction devices may include, but are not limited to, one or more brake devices, one or more torque transmitting devices (i.e., clutches), and the like. Generally, the operation (e.g., engagement and disengagement) of the one or more friction devices is controlled by selectively controlling the friction applied by, or otherwise associated with, each of the one or more friction devices, such as by controlling fluid pressure applied to each of the friction devices, for example. In the illustrative embodiment, which is not intended to be limiting in any way, the electro-hydraulic system 138 may be coupled to, or otherwise adapted for use with, one or more brakes. Similar to the clutches, each of the one or more brakes may be controllably engaged and disengaged via fluid pressure supplied by the electro-hydraulic system 138. In any case, changing or shifting between the various gears of the transmission 120 is accomplished by selectively controlling the friction devices via control of fluid pressure within the number of fluid paths $140_1$-$140_J$.

In the illustrative drive system 100 shown in FIG. 1, the torque converter 108 and the transmission 120 include a number of sensors configured to produce sensor signals that are indicative of one or more operating states of the torque converter 108 and the transmission 120, respectively. For example, the torque converter 108 illustratively includes a speed sensor 146 that is configured to produce a speed signal corresponding to the rotational speed of the pump shaft 106, which rotates at the same speed as the output shaft 104 of the drive unit 102 in use of the drive system 100. The speed sensor 146 is electrically connected to a pump speed input (i.e., PS) of the controller 702 via a signal path 152, and the controller 702 is operable to process the speed signal produced by the speed sensor 146 to determine the rotational speed of the pump shaft 106/drive unit output shaft 104.

In the illustrative drive system 100, the transmission 120 includes a speed sensor 148 that is configured to produce a speed signal corresponding to the rotational speed of the transmission input shaft 122, which rotates at the same speed as the turbine shaft 114 of the torque converter 108 in use of the system 100. The input shaft 122 of the transmission 120 may be directly coupled to, or otherwise integral with, the turbine shaft 114. Of course, it should be appreciated that the speed sensor 148 may alternatively be configured to produce a speed signal corresponding to the rotational speed of the turbine shaft 114. Regardless, the speed sensor 148 is electrically connected to a transmission input shaft speed input (i.e., TIS) of the controller 702 via a signal path 154, and the controller 702 is operable to process the speed signal produced by the speed sensor 148 to determine the rotational speed of the turbine shaft 114/transmission input shaft 124.

Further, in the illustrative system 100, the transmission 120 includes a speed sensor 150 that is configured to produce a speed signal corresponding to the rotational speed and direction of the output shaft 124 of the transmission 120. The speed sensor 150 is electrically connected to a transmission output shaft speed input (i.e., TOS) of the controller 802 via a signal path 156. The controller 702 is configured to process the speed signal produced by the speed sensor 150 to determine the rotational speed of the transmission output shaft 124.

In some embodiments, the electro-hydraulic system 138 includes one or more actuators configured to control various operations within the transmission 120. For example, the electro-hydraulic system 138 may include a number of actuators that are electrically connected to a number (i.e., J) of control outputs $CP_1$-$CP_J$ of the controller 802 via a corresponding number of signal paths $72_1$-$72_J$, where J may be any positive integer as described above. Each of the actuators may receive a corresponding one of the control signals $CP_1$-$CP_J$ produced by the controller 702 via one of the corresponding signal paths $72_1$-$72_J$. In response thereto, each of the actuators may control the friction applied by each of the friction devices by controlling the pressure of fluid within one or more corresponding fluid passageway $140_1$-$140_J$, thereby controlling the operation of one or more corresponding friction devices based on information provided by the various speed sensors 146, 148, and/or 150 in use of the system 100.

In the illustrative embodiment, the drive system 100 includes a drive unit controller 160 having an input/output port (I/O) that is electrically coupled to the drive unit 102 via a number (i.e., K) of signal paths 162, wherein K may be any positive integer. The drive unit controller 160 is operable to control and manage the overall operation of the drive unit 102. The drive unit controller 160 includes a communication port (i.e., COM) which is electrically connected to a similar communication port (i.e., COM) of the controller 802 via a number (i.e., L) of signal paths 164, wherein L may be any positive integer. It should be appreciated that the one or more signal paths 164 may be referred to collectively as a data link. Generally, the drive unit controller 160 and the transmission controller 702 are operable to share information via the one or more signal paths 164. In one embodiment, for example, the drive unit controller 160 and the transmission controller 702 are operable to share information via the one or more signal paths 164 in the form of one or more messages in accordance with a Society of Automotive Engineers (SAE) J-1939 communications protocol. Of course, it should be appreciated that this disclosure contemplates other embodiments in which the drive unit controller 160 and the transmission controller 802 are operable to share information via the one or more signal paths 164 in accordance with one or more other communication protocols (e.g., from a conventional databus such as J1587 data bus, J1939 data bus, IESCAN data bus, GMLAN, Mercedes PT-CAN).

Referring again to FIG. 2, in the illustrative embodiment, at least a portion of the park system 200 (e.g., the actuator valve 220 and the actuation linkage 230) is supported by a housing 202. The housing 202 includes, or is otherwise embodied as, any structure or collection of structures configured to at least partially house the park system 200 in an interior space 204 thereof. In some embodiments, the housing 202 may include, or otherwise define, an exterior case or enclosure defining the interior space 204.

The illustrative housing 202 supports a manifold 206 of the hydraulic system 750. The manifold 206 is formed, among other things, to include a network of fluid passages in fluid communication with one another to route hydraulic fluid to various devices of the hydraulic system 750, such as the actuator valve 220, for example. At least in some embodiments, the manifold 206 includes, or otherwise forms a portion of, a hydraulic circuit 208 of the hydraulic system 750. In such embodiments, the various devices of the hydraulic system 750 may be fluidly coupled to one another via fluid paths established by the manifold 206.

In some embodiments, the park gear assembly 210 includes the gear 212, a park pawl (not shown), a plurality of rollers 214, and a ramp (not shown). The park pawl may be movable to directly contact the gear 212 (e.g., in the engaged state 300 of the park system 200) and to be spaced from, and not in direct contact with, the gear 212 (e.g., in the disengaged state 400). The rollers 214 may be movable along the ramp (i.e., in one direction) to cause contact between the park pawl and the gear 212. The rollers 214 may be movable along the ramp (i.e., in another direction opposite the one direction) to cause the park pawl to be spaced from the gear 212. The rollers 214 may be coupled together for common movement along and/or parallel to the ramp by a carriage or carrier 216.

In the illustrative embodiment, the rollers 214 are operatively coupled to a rod 250 of the actuation linkage 230 that, as discussed below, is adapted for translation along a longitudinal axis 349 (see FIG. 3) spaced from the longitudinal axis 320 and arranged parallel or substantially parallel to the axis 320. In some embodiments, an end 352 of the rod 250 is configured for direct interaction with the rollers 214. Although the rod 250 is described herein as a component of the actuation linkage 230, the rod 250 may be incorporated into the park gear assembly 210 and considered as a component of the park gear assembly 210, at least in some embodiments. In any case, as best seen in FIGS. 3 and 4, the rod 250 is pivotally coupled to the body 340 of the plate 240. The rod 250 supports, and is at least partially surrounded by, a biasing element 254 such that the biasing element 254 extends along the longitudinal axis 349 between the rollers 214 and the body 340 of the plate 240.

The illustrative actuation linkage 230 includes a detent spring 260 that is coupled to the plate 240 and a stationary structure. More specifically, the detent spring 260 includes an end 262 that is coupled to a stationary structure (e.g., a stationary structure housed by the housing 202) and an end 264 that is coupled to a detent pin 266. As best seen in FIGS. 3 and 4, the detent pin 266 is sized for positioning in one of the notches 342, 344 formed in the body 340 of the plate 240 in each of the engaged and disengaged states 300, 400 of the park gear assembly 210.

In the illustrative embodiment, the park system 200 includes a selector shaft 270 pivotally coupled to the body 340 of the plate 240 as shown in FIGS. 2-4. In some embodiments, the selector shaft 270 is rotatable to cause rotation of the plate 240 about the rotational axis RA and drive operation of the park gear assembly 210 in the engaged state 300 or the disengaged state 400. As such, at least in some embodiments, the selector shaft 270 and the plate 240 are coupled together for common rotation about the rotational axis RA.

In some embodiments, the selector shaft 270 includes, or is otherwise embodied as, a shift-by-cable selector shaft configured for movement (i.e., rotation) in response to an input (e.g., an operator input) received by the controller 702 of the control system 700. Of course, it should be appreciated that in such embodiments, movement of the selector shaft 270 may be directed by the controller 702 (e.g., using a motor or other suitable actuator) in response to receiving particular input. As the shift-by-cable selector shaft is an electrically-powered device, the operation of the shaft 270 may be unaffected by a fault or failure encountered in use of the hydraulic system 750, such as a fault in the hydraulic system 750 that compromises fluid main pressure, for example. Accordingly, at least in some embodiments, inclusion of the shaft 270 provides a redundant mechanism for driving rotation of the plate 240, and corresponding operation of the park gear assembly 210, in the event of a failure in the hydraulic system 750 in use of the park system 200.

The park system 200 includes a position sensor 280 as illustrated in FIGS. 2-4 to generate a signal indicative of a position of the valve element 222 of the actuator valve 220 along the longitudinal axis 320 in use of the system 200. In some embodiments, the sensor 280 includes, or is otherwise embodied as, any electrical device or collection of electrical devices capable of detecting a position of the valve element 222 along the longitudinal axis 320 in use of the park system 200. Additionally, in some embodiments, the sensor 280 includes, or is otherwise embodied as, a proximity sensor, such as a capacitive proximity sensor, an inductive proximity sensor, a hall effect sensor, or the like. Of course, in other embodiments, the sensor 280 may include, or otherwise be embodied as, another suitable sensor.

The park system 200 includes a locking pin 290 as illustrated in FIGS. 2-4 to selectively block translation of the valve element 222 along the longitudinal axis 320 and thereby secure the position of the valve element 222 along the axis 320 in use of the system 200. In the illustrative embodiment, the locking pin 290 includes, or is otherwise embodied as, a solenoid-driven locking pin sized for positioning in one of several grooves formed in the valve element 222, as further discussed below. In other embodiments, the locking pin 290 may include, or otherwise be embodied as, another suitable device capable of securing the position of the valve element 222 along the axis 320 in use of the system 200.

In the illustrative embodiment, the valve element 222 of the actuator valve 220 is formed to include an annular groove 226 at an outer periphery 228 thereof. Additionally, the valve element 222 is formed to include an annular groove 232 at the outer periphery 228. The annular grooves 226, 232 are spaced apart from one another along the valve element 222 and the longitudinal axis 320. Each of the grooves 226, 232 is illustratively sized to receive a pin (not shown) of the locking pin 290 such that when the pin is positioned in one of the grooves 226, 232, the position of the valve element 222 along the axis 320 is secured as indicated above.

Referring now to FIGS. 3 and 4, the mount extension 348 of the plate 240 is pivotally coupled to the valve element 222 of the actuator valve 220 for rotation about a rotational axis RA'. The rotational axis RA' and the rotational axis RA are illustratively spaced from one another in a direction 322 parallel to the longitudinal axis 320. The mount extension 348 and the body 340 therefore define separate structures of the plate 240 that are spaced from one another in the direction 322 and configured for rotation about the rotational axes RA' and RA, respectively.

The rod 250 of the actuation linkage 230 is illustratively coupled to the body 340 via a collar 360 of the body 340. In at least some embodiments, the rod 250 and the body 340 of the plate 240 are pivotally coupled to one another at least partially by the collar 360. In the illustrative embodiment, the collar 360 is arranged opposite the outermost edge 346 having the notches 342, 344 formed therein. In some embodiments, the collar 360 includes an aperture 362 extending therethrough that at least partially receives the rod 250. Further, in some embodiments, the collar 360 receives the rod 250 to permit translation of the rod 250 along the longitudinal axis 349 in response to movement of the valve element 222 along the longitudinal axis 320.

In some embodiments, the coupling between the rod 250 and the body 340 via the collar 360 permits a degree of relative movement between the rod 250 and the body 340 in use of the park system 200. In one example, the collar 360 permits some amount of movement of the rod 250 relative to the body 340 along the longitudinal axis 349. In some cases, the collar 360 may permit a minimal amount of linear movement of the rod 250 relative to the body 340 along the axis 349, such as zero or substantially zero linear movement, for instance. In another example, the collar 360 permits some amount of rotational movement of the rod 250 relative to the body 340. In some cases, the collar 360 may permit a minimal amount of rotational movement of the rod 250 relative to the body 340, such as zero or substantially zero rotational movement between the rod 250 and the body 340, for instance.

Figure 5:
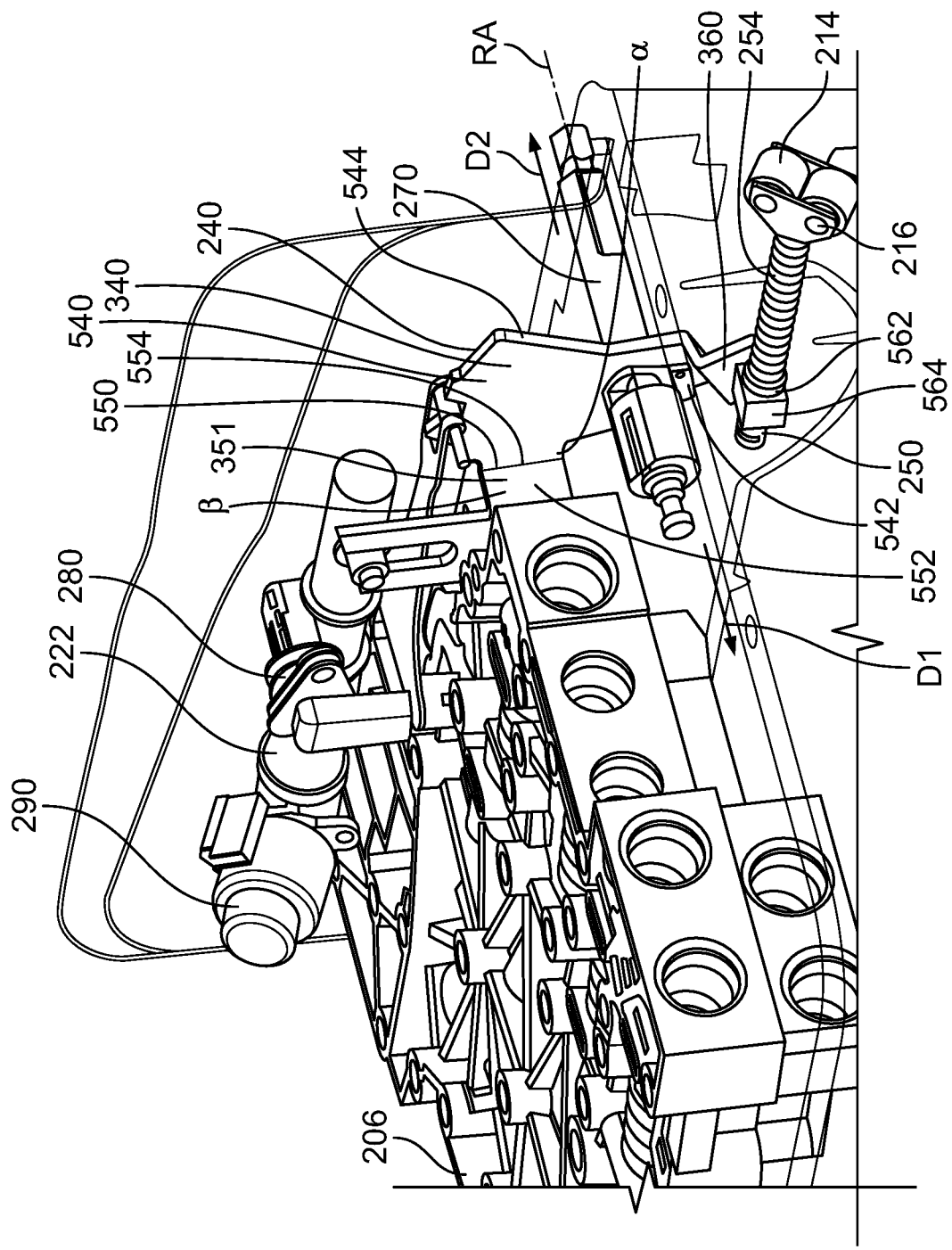
FIG. 5 is a perspective view of an actuation linkage and an actuator valve of the park system of FIG. 2.

As mentioned above, the body 340 and the mount extension 348 are illustratively formed as separate structures of the plate 240. In some embodiments, the body 340 and the mount extension 348 are interconnected via a tab 351 of the plate 240. As best seen in FIG. 5, the tab 351 extends outwardly away from the body 340 to interconnect the body 340 with the mount extension 348. In one example, the tab 351 extends outwardly away from a face 540 (see FIG. 5) of the body 340 in a direction perpendicular or substantially perpendicular to the face 540 to interconnect the body 340 with the mount extension 348. In some embodiments, the tab 351 includes, or otherwise defines, a reinforcement structure interconnecting the body 340 and the mount extension 348. In such embodiments, the tab 351 may include, or otherwise define, a stiffening tab, rib, spine, or similar structure, as the case may be.

In the illustrative engaged state 300 of the park gear assembly 210, the hydraulic system 750 supplies a hydraulic fluid pressure P1 to the valve element 222 of the actuator valve 220 such that the annular groove 226 is aligned with the locking pin 290 along the longitudinal axis 320. More specifically, as discussed in greater detail below with reference to FIG. 7, a first pressure control solenoid supplies the hydraulic fluid pressure P1 to the valve element 222 to drive operation of the park system 200 and the park gear assembly 210 in the engaged state 300. In any case, when the park gear assembly 210 is in the engaged state 300, the pin of the locking pin 290 is positioned in the annular groove 226 to block movement of the valve element 222 along the longitudinal axis 320.

To transition the park gear assembly 210 and the park system 200 from the engaged state 300 to the disengaged state 400, a number of loads and/or forces may be applied to the system 200. In one aspect, a park load PL1 may be applied to the rod 250 to cause translation of the rod 250 along the longitudinal axis 349 and thereby transition the park gear assembly 210 from the engaged state 300 to the disengaged state 400. In some embodiments, the park load PL1 may be 244 lbs. In another aspect, a torque T1 may be applied to the plate 240 to drive rotation of the body 340 and the mount extension 348 about the corresponding rotational axes RA and RA' in the clockwise direction indicated by arrow CW to transition the park gear assembly 210 from the engaged state 300 to the disengaged state 400. In some embodiments, the torque T1 may be 25 lb-ft. In yet another aspect, a valve force VF1 may be applied to the actuator valve 220 to cause translation of the valve element 222 along the longitudinal axis 320 and thereby transition the park gear assembly 210 from the engaged state 300 to the disengaged state 400. In some embodiments, the valve force VF1 may be 92 lbs. In yet another aspect still, a hydraulic load HL1 may be applied to the actuator valve 220 to cause translation of the valve element 222 along the longitudinal axis 320 and thereby transition the park gear assembly 210 from the engaged state 300 to the disengaged state 400. In some embodiments, the hydraulic load HL1 may be 131 psi.

In the illustrative engaged state 400 of the park gear assembly 210, the hydraulic system 750 supplies a hydraulic fluid pressure P2 to the valve element 222 of the actuator valve 220 such that the annular groove 232 is aligned with the locking pin 290 along the longitudinal axis 320. More specifically, as discussed in greater detail below with reference to FIG. 7, a second pressure control solenoid supplies the hydraulic fluid pressure P2 to the valve element 222 to drive operation of the park system 200 and the park gear assembly 210 in the engaged state 400. In any case, when the park gear assembly 210 is in the engaged state 400, the pin of the locking pin 290 is positioned in the annular groove 232 to block movement of the valve element 222 along the longitudinal axis 320. In some embodiments, the fluid pressure P2 may be different from the fluid pressure P1.

To transition the park gear assembly 210 and the park system 200 from the disengaged state 400 to the engaged state 300, a number of loads and/or forces may be applied to the system 200. In one aspect, a park load PL2 may be applied to the rod 250 to cause translation of the rod 250 along the longitudinal axis 349 and thereby transition the park gear assembly 210 from the disengaged state 400 to the engaged state 300. In some embodiments, the park load PL2 may be 24.4 lbs. In another aspect, a torque T2 may be applied to the plate 240 to drive rotation of the body 340 and the mount extension 348 about the corresponding rotational axes RA and RA' in the counterclockwise direction indicated by arrow CCW to transition the park gear assembly 210 from the disengaged state 400 to the engaged state 300. In some embodiments, the torque T2 may be 2.5 lb-ft. In yet another aspect, a valve force VF2 may be applied to the actuator valve 220 to cause translation of the valve element 222 along the longitudinal axis 320 and thereby transition the park gear assembly 210 from the disengaged state 400 to the engaged state 300. In some embodiments, the valve force VF2 may be 9.2 lbs. In yet another aspect still, a hydraulic load HL2 may be applied to the actuator valve 220 to cause translation of the valve element 222 along the longitudinal axis 320 and thereby transition the park gear assembly 210 from the disengaged state 400 to the engaged state 300. In some embodiments, the hydraulic load HL2 may be 43 psi.

Referring now to FIG. 5, in the illustrative embodiment, the selector shaft 270 is received through a bore 542 formed in the body 340 such that the shaft 270 is supported for pivotal movement relative to the body 340 of the plate 240 about the rotational axis RA. In the illustrative arrangement, the shaft 270 extends outwardly away from, and perpendicular to, a face 544 of the body 340. The faces 540, 544 of the body 340 are illustratively arranged opposite one another. The tab 351 extends outwardly away from the face 540 in a direction D1 and the selector shaft 270 extends outwardly away from the face 544 in a direction D2. In some embodiments, the directions D1 and D2 are parallel to one another.

In the illustrative embodiment, the tab 351 includes a bend 550 defined between two interconnected sections 552, 554 of the tab 351. The section 554 is arranged in closer proximity to the face 540 than the section 552. The section 554 extends outward away from the face 540 at an angle α and the section 552 extends outward away from the face 540 at an angle β. In some embodiments, the angle α is less than 90 degrees. Additionally, in some embodiments, the angle β is equal to or substantially equal to 90 degrees.

In the illustrative embodiment, the rod 250 is coupled to the collar 360 of the plate 240 such that the collar 360 supports a ring 562 and a locating block 564. The ring 562 and the locating block 564 illustratively receive the rod 250, and the ring 562 abuts the biasing element 254. In some embodiments, the ring 562 and the locating block 564 are mounted in direct contact with the collar 360, and the ring 562 and the locating block 564 are capable of sliding movement relative to the collar 360. Additionally, in some embodiments, the ring 562 and the locating block 564 cooperate to at least partially control movement of the rod 250 relative to the collar 360 in use of the park system 200. In such embodiments, the ring 562 and the locating block 564 cooperate to permit limited translational and/or rotational movement between the rod 250 and the collar 360 in use of the park system 200.

Figure 6:
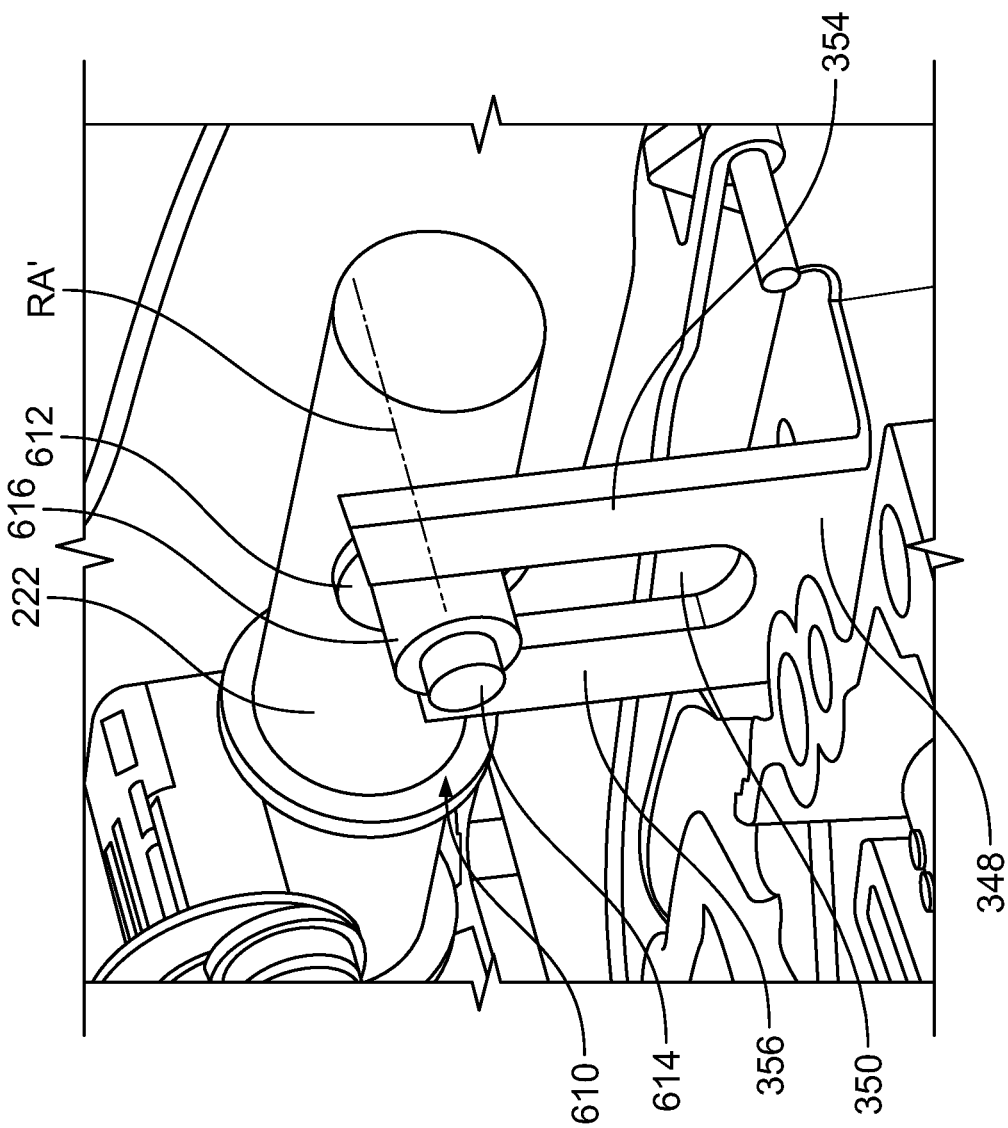
FIG. 6 is a magnified perspective view showing a pivotal coupling between a plate and a valve element of the park system of FIG. 2.

Referring now to FIG. 6, the mount extension 348 is pivotally coupled to the valve element 222 via a pivotal coupling 610. A mount base 612 is affixed to, and in direct contact with, the valve element 222. A mount post 614 extends outwardly away from, and perpendicular or substantially perpendicular to, the mount base 612. A mount ring or washer 616 extends around the mount post 614 and is arranged in abutment with the mount base 612.

In the illustrative embodiment, the mount ring 616 is sized to be positioned in the slot 350 such that the mount arms 354, 356 directly contact, and pivot relative to, the mount ring 616 in use of the park system 200. The mount base 612, the mount post 614, and the mount ring 616 therefore cooperate to establish the pivotal coupling 610 which permits rotation of the mount extension 348 relative to the valve element 222 about the rotational axis RA' in use of the system 200.

Figure 7:
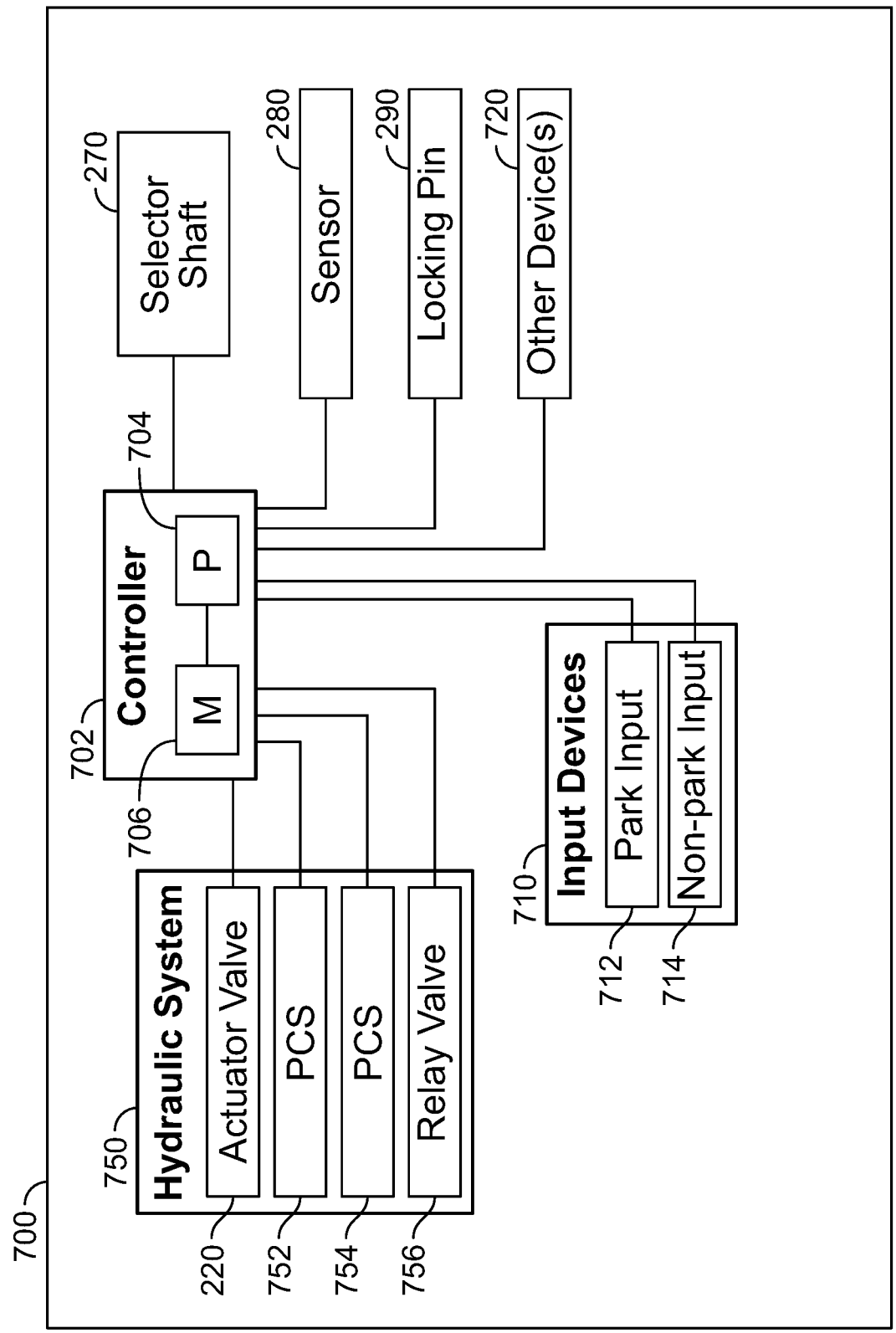
FIG. 7 is a diagrammatic view of a control system for the drive system of FIG. 1.

Referring now to FIG. 7, in the illustrative embodiment, the control system 700 includes the hydraulic system 750, the selector shaft 270, the position sensor 280, the locking pin 290, the controller 702, input devices 710, and other device(s) 720. Each of the devices 750, 270, 280, 290, 710, and 720 is communicatively coupled to the controller 702, such as by a direct (e.g., hardwired) connection or a controller area network (CAN) interface, for example. Of course, it should be appreciated that the control system 700 may include other electrical and/or electromechanical devices in addition to, or as an alternative to, the devices depicted in FIG. 7. In any case, the illustrative controller 702 includes a processor 704 (or one or more processors) and at least one memory device 706 communicatively coupled to the processor 704.

The processor 704 of the illustrative controller 702 may be embodied as, or otherwise include, any type of processor, controller, or other compute circuit capable of performing various tasks such as compute functions and/or controlling the functions of the transmission 120 and/or the park system 200, for example. For example, the processor 704 may be embodied as a single or multi-core processor(s), a microcontroller, or other processor or processing/controlling circuit. In some embodiments, the processor 704 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 704 may be embodied as, or otherwise include, a high-power processor, an accelerator co-processor, or a storage controller. In some embodiments still, the processor 704 may include more than one processor, controller, or compute circuit.

The memory device 706 of the illustrative controller 702 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 706 may be embodied as a block addressable memory, such as those based on NAND or NOR technologies. The memory device 706 may also include future generation nonvolatile devices, such as a three dimensional crosspoint memory device (e.g., Intel 3D XPoint™ memory), or other byte addressable write-in-place nonvolatile memory devices. In some embodiments, the memory device 706 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The illustrative hydraulic system 750 includes the actuator valve 220 as mentioned above. The actuator valve 220 includes, or is otherwise embodied as, a hydraulic actuator valve configured to convert fluid pressure into linear motion (e.g., of the valve element 222) to drive operation of the park system 200. In the illustrative embodiment, the actuator valve 220 is fluidly coupled to a pressure control solenoid 752 and to a pressure control solenoid 754. The pressure control solenoids 752, 754 are operable to supply hydraulic fluid pressure to the actuator valve 220 to direct operation of the valve 220 in each of the engaged and disengaged states 300, 400 of the park gear assembly 210, as discussed below.

The illustrative hydraulic system 750 includes the pressure control solenoid (PCS) 752 which is communicatively coupled to the controller 702. In the illustrative embodiment, the pressure control solenoid 752 includes, or is otherwise embodied as, any variable-force solenoid or collection of variable-force solenoids configured to receive input (e.g., one or more control signals) from the controller 702 and supply variable hydraulic fluid pressure to the actuator valve 220 in response to the input provided by the controller 702. In some embodiments, the pressure control solenoid 752 is configured to supply the hydraulic fluid pressure P1 to the actuator valve 220 in the engaged state 300 of the park gear assembly 210. In such embodiments, the hydraulic fluid pressure P1 may correspond to a trim pressure regulated by a main regulator valve (not shown) of the hydraulic system 750.

The illustrative hydraulic system 750 includes the pressure control solenoid 754 which is communicatively coupled to the controller 702. In the illustrative embodiment, the pressure control solenoid 754 includes, or is otherwise embodied as, any variable-force solenoid or collection of variable-force solenoids configured to receive input (e.g., one or more control signals) from the controller 702 and supply variable hydraulic fluid pressure to the actuator valve 220 in response to the input provided by the controller 702. In some embodiments, the pressure control solenoid 754 is configured to supply the hydraulic fluid pressure P2 to the actuator valve 220 in the disengaged state 400 of the park gear assembly 210. In such embodiments, the hydraulic fluid pressure P2 may correspond to a trim pressure regulated by the main regulator valve of the hydraulic system 750.

The illustrative hydraulic system 750 may include at least one relay valve 756. In some embodiments, however, it should be appreciated that the relay valve 756 may be omitted. In some embodiments, the relay valve 756 is fluidly coupled between the actuator valve 220 and each of the pressure control solenoids 752, 754 to route fluid pressure supplied by one of the solenoids 752, 754 to the actuator valve 220 in use of the park system 200. In one example, the relay valve 756 is operable to route the hydraulic fluid pressure P1 supplied by the pressure control solenoid 752 to the actuator valve 220 to drive operation of the park gear assembly 210 in the engaged state 300. In another example, the relay valve 756 is operable to route the hydraulic fluid pressure P2 supplied by the pressure control solenoid 754 to the actuator valve 220 to drive operation of the park gear assembly 210 in the disengaged state 400. Regardless, the relay valve 756 includes, or is otherwise embodied as, any valve or collection of valves fluidly coupled between each of the solenoids 752, 754 and the actuator valve 220 and configured to route or relay hydraulic fluid pressure supplied by the solenoids 752, 754 to the actuator valve 220.

Although not shown, in some embodiments, the hydraulic system 750 may include a number of devices in addition to those depicted in FIG. 7. Those devices may include, but are not limited to, one or more trim systems, sensors, controllers, pressure control solenoids, solenoid valves, regulator valves, and flow control devices. The additional device(s) may be communicatively coupled to the controller 702 to receive input (e.g., one or more control signals) therefrom and/or provide input thereto. The additional device(s) may be included in, or otherwise form a portion of, the hydraulic circuit 208 of the hydraulic system 750.

In some embodiments, the memory device 706 of the controller 702 may include and/or store instructions that, when executed by the processor 704, cause the processor 704 to control delivery of hydraulic fluid pressure to the actuator valve 220 through the pressure control solenoids 752, 754 and the relay valve 756 in use of the park system 200. The instructions may be executed by the control system 700 to perform a method of operating the park system 200 using the actuator valve 220, the solenoids 752, 754, and the relay valve 756, at least in some embodiments.

As mentioned above, the selector shaft 270 illustratively includes, or is otherwise embodied as, a shift-by-cable selector shaft configured for movement (i.e., rotation) in response to an input (e.g., an operator input) received by the controller 702. In some embodiments, in response to input provided by one of the input devices 710, the controller 702 is operable to direct rotation of the selector shaft 270 via one or more electrically-powered devices, such as one or more electric motors, electric actuators, or the like.

As indicated above, the sensor 280 illustratively includes, or is otherwise embodied as, any electrical device or collection of electrical devices capable of generating a signal indicative of a position of the valve element 222 along the longitudinal axis 320 in use of the park system 200. The illustrative sensor 280 includes a hall-effect sensor. Of course, in other embodiments, the sensor 280 may include another suitable device.

As mentioned above, the locking pin 290 illustratively includes, or is otherwise embodied as, a solenoid-driven locking pin sized for positioning in one of the grooves 226, 232 formed in the valve element 222. The locking pin (not shown) is configured to extend (e.g., when active or deployed) into, or retract (e.g., when inactive or stowed) outside of, the grooves 226, 232.

In the illustrative embodiment, the input devices 710 include a park input 712 and a non-park input 714. Each of the inputs 712 and 714 is communicatively coupled to the controller 702, at least in some embodiments. The park input 712 includes, or is otherwise embodied as, an input device that may be selected by a user to direct operation of the transmission 120 and the park system 200 in a park operating mode corresponding to the engaged state 300. The non-park input 714 includes, or is otherwise embodied as, an input device that may be selected by a user to direct operation of the transmission 120 and the park system 200 in a non-park operation mode (e.g., a drive or neutral mode) corresponding to the disengaged state 400.

In some embodiments, the other device(s) 720 include one or more other electrical or electromechanical devices included in the park system 200, the transmission 120, and/or the drive system 100. The device(s) 720 may be incorporated into, or otherwise associated with, the drive unit 102, the torque converter 108, the transmission 120, the gearing system 126, or the electro-hydraulic system 138, as the case may be. For example, the device(s) 720 may include the speed sensors 146, 148, 150, at least in some embodiments. In another example, the device(s) 720 may include the controller 160. Additionally, in some embodiments, the device(s) 720 may include one or more sensors, controllers, solenoids, solenoid valves, and flow control devices, among other things.

Figure 8:
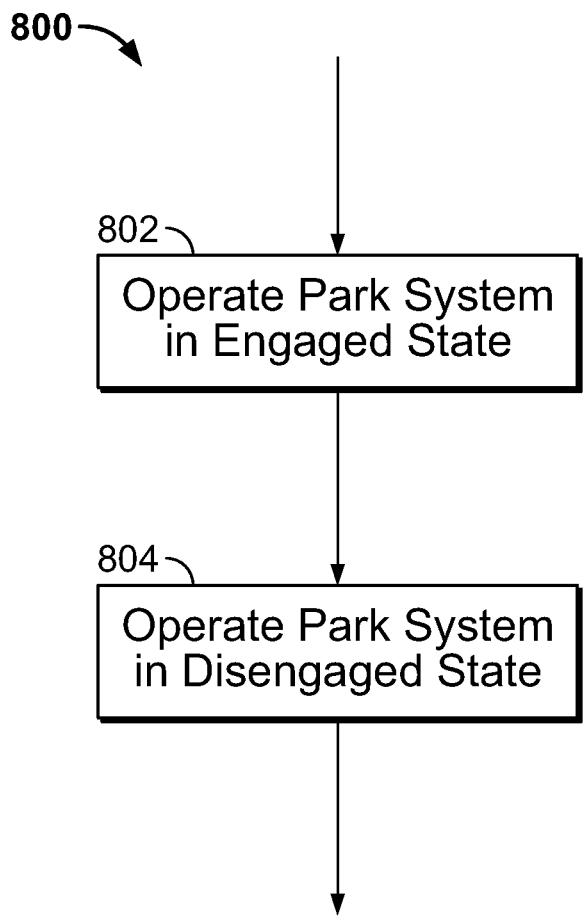
FIG. 8 is a simplified flowchart of a method of operating the transmission shown in FIG. 1.

Referring now to FIG. 8, an illustrative method 800 of operating the transmission 120 may be embodied as, or otherwise include, a set of instructions that are executable by the control system 700. The method 800 corresponds to, or is otherwise associated with, performance of the blocks described below in the illustrative sequence of FIG. 8. It should be appreciated, however, that the method 800 may be performed in one or more sequences different from the illustrative sequence.

The illustrative method 800 begins with block 802. In block 802, the controller 702 operates the transmission 120 and the park system 200 in the engaged state 300. As a result, in block 802, the controller 702 resists rotation of the output shaft 124 using the park gear assembly 210 of the system 200. In the illustrative embodiment, to perform block 802, the controller 702 performs the method 900 described below with reference to FIG. 9. From block 802, the method 800 proceeds to block 804.

In block 804 of the illustrative method 800, the controller 702 operates the transmission 120 and the park system 200 in the disengaged state 400. Consequently, in block 804, the controller 702 allows rotation of the output shaft 124 using the park gear assembly 210 of the system 200. In the illustrative embodiment, to perform block 804, the controller 702 performs the method 1000 described below with reference to FIG. 10.

Figure 9:
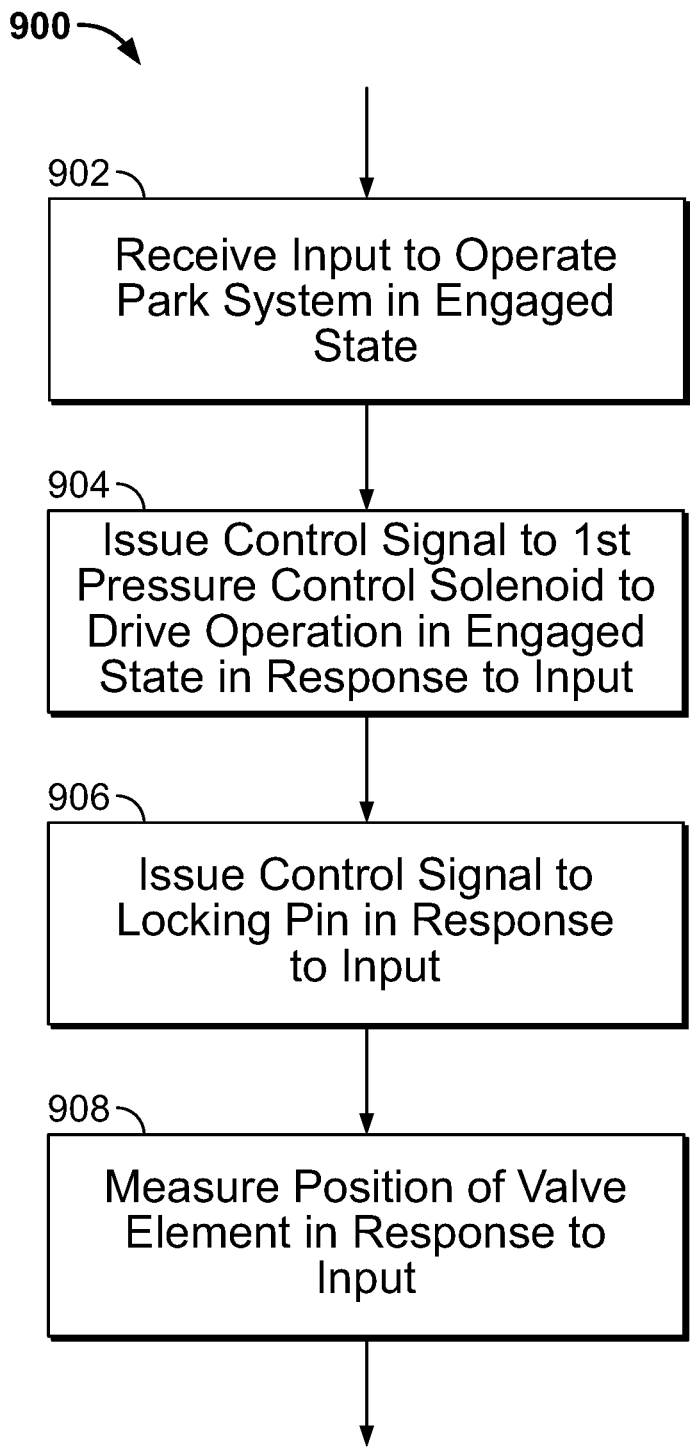
FIG. 9 is a simplified flowchart of a method of performing one of the blocks of the method of FIG. 8.

Referring now to FIG. 9, an illustrative method 900 of operating the transmission 120 and the park system 200 in the engaged state 300 may be embodied as, or otherwise include, a set of instructions that are executable by the control system 700. The method 900 corresponds to, or is otherwise associated with, performance of the blocks described below in the illustrative sequence of FIG. 9. It should be appreciated, however, that the method 900 may be performed in one or more sequences different from the illustrative sequence.

The illustrative method 900 begins with block 902. In block 902, the controller 702 receives input (e.g., from a user) to operate the transmission 120 and the park system 200 in the engaged state 300. For example, in block 902, the controller 702 may receive input from the park input 712. In other embodiments, the controller 702 may receive input from another input device indicative of desired operation in the engaged state 300. From block 902, the method 900 proceeds to block 904.

In block 904 of the illustrative method 900, the controller 702 issues a control signal to the pressure control solenoid 752 to drive operation of the park system 200 in the engaged state 300 in response to the input received in block 902. In the illustrative embodiment, the control signal issued by the controller 702 in block 904 directs delivery of the hydraulic fluid pressure P1 supplied by the pressure control solenoid 752 to the actuator valve 220 to cause translation of the valve element 222 along the longitudinal axis 320 such that the annular groove 226 is aligned with the locking pin 290 as shown in FIG. 3. From block 904, the method 900 subsequently proceeds to block 906.

In block 906 of the illustrative method 900, the controller 702 issues a control signal to the locking pin 290 to cause extension of the locking pin into the groove 226 in response to the input received in block 902. As a result of the control signal issued by the controller 702 in block 906, movement of the valve element 222 along the longitudinal axis 320 is blocked by the locking pin 290 and the valve element 222 is maintained in the position corresponding to the engaged state 300. From block 906, the method 900 proceeds to block 908.

In block 908 of the illustrative method 900, the controller 702 measures a position of the valve element 222 along the longitudinal axis 320 in response to the input received in block 902. It should be appreciated that measurement is performed in block 908 with, and based on, a position of the valve element 222 along the axis 320 that is detected by the sensor 280. In some embodiments, the position measured in block 908 may provide a diagnostic indicator for evaluating operation of the park system 200 in the engaged state 300 in the use of the transmission 120.

Figure 10:
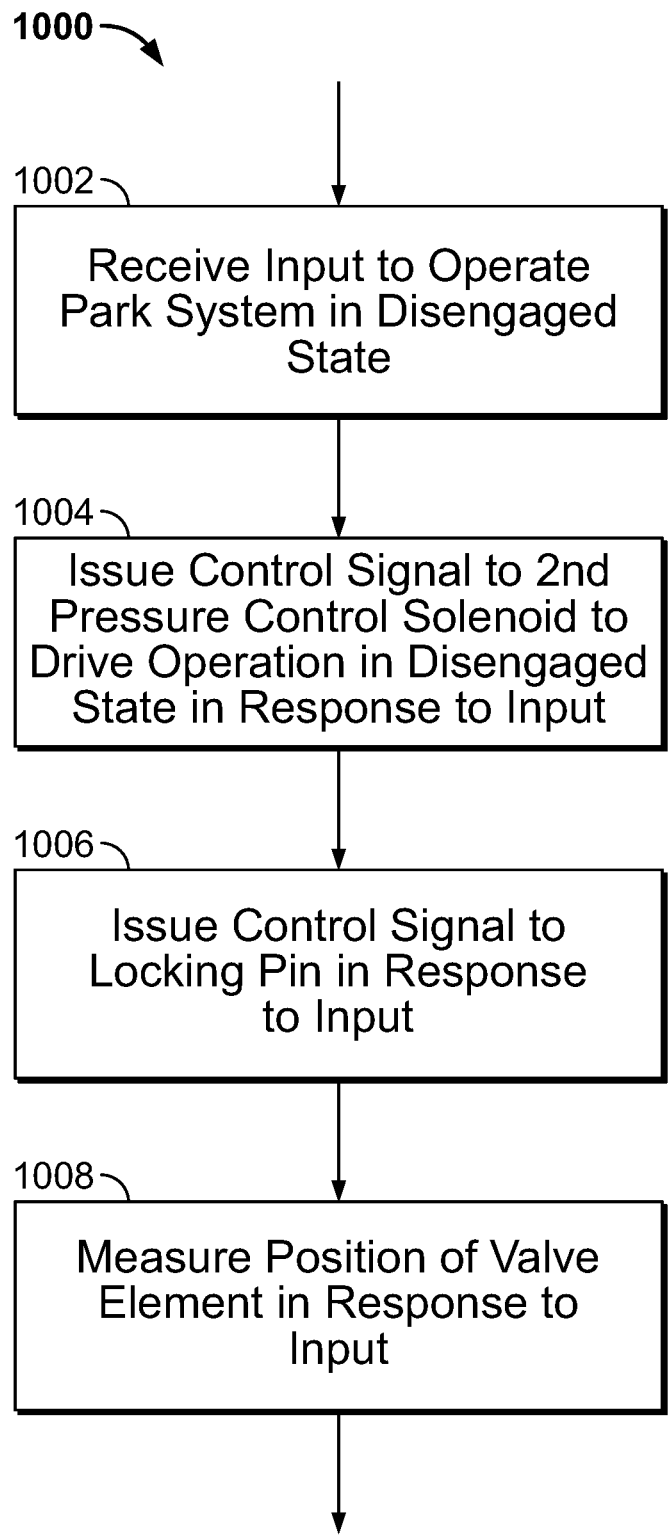
FIG. 10 is a simplified flowchart of a method of performing another one of the blocks of the method of FIG. 8.

Referring now to FIG. 10, an illustrative method 1000 of operating the transmission 120 and the park system 200 in the disengaged state 400 may be embodied as, or otherwise include, a set of instructions that are executable by the control system 700. The method 1000 corresponds to, or is otherwise associated with, performance of the blocks described below in the illustrative sequence of FIG. 10. It should be appreciated, however, that the method 1000 may be performed in one or more sequences different from the illustrative sequence.

The illustrative method 1000 begins with block 1002. In block 1002, the controller 702 receives input (e.g., from a user) to operate the transmission 120 and the park system 200 in the disengaged state 400. For example, in block 1002, the controller 702 may receive input from the non-park input 714. In other embodiments, the controller 702 may receive input from another input device indicative of desired operation in the disengaged state 400. From block 1002, the method 1000 proceeds to block 1004.

In block 1004 of the illustrative method 1000, the controller 702 issues a control signal to the pressure control solenoid 754 to drive operation of the park system 200 in the disengaged state 400 in response to the input received in block 1002. In the illustrative embodiment, the control signal issued by the controller 702 in block 1004 directs delivery of the hydraulic fluid pressure P2 supplied by the pressure control solenoid 754 to the actuator valve 220 to cause translation of the valve element 222 along the longitudinal axis 320 such that the annular groove 232 is aligned with the locking pin 290 as shown in FIG. 4. From block 1004, the method 1000 subsequently proceeds to block 1006.

In block 1006 of the illustrative method 1000, the controller 702 issues a control signal to the locking pin 290 to cause extension of the locking pin into the groove 232 in response to the input received in block 1002. As a result of the control signal issued by the controller 702 in block 1006, movement of the valve element 222 along the longitudinal axis 320 is blocked by the locking pin 290 and the valve element 222 is maintained in the position corresponding to the disengaged state 400. From block 1006, the method 1000 proceeds to block 1008.

In block 1008 of the illustrative method 1000, the controller 702 measures a position of the valve element 222 along the longitudinal axis 320 in response to the input received in block 1002. It should be appreciated that measurement is performed in block 1008 with, and based on, a position of the valve element 222 along the axis 320 that is detected by the sensor 280. In some embodiments, the position measured in block 1008 may provide a diagnostic indicator for evaluating operation of the park system 200 in the disengaged state 400 in the use of the transmission 120.

Figure 11:
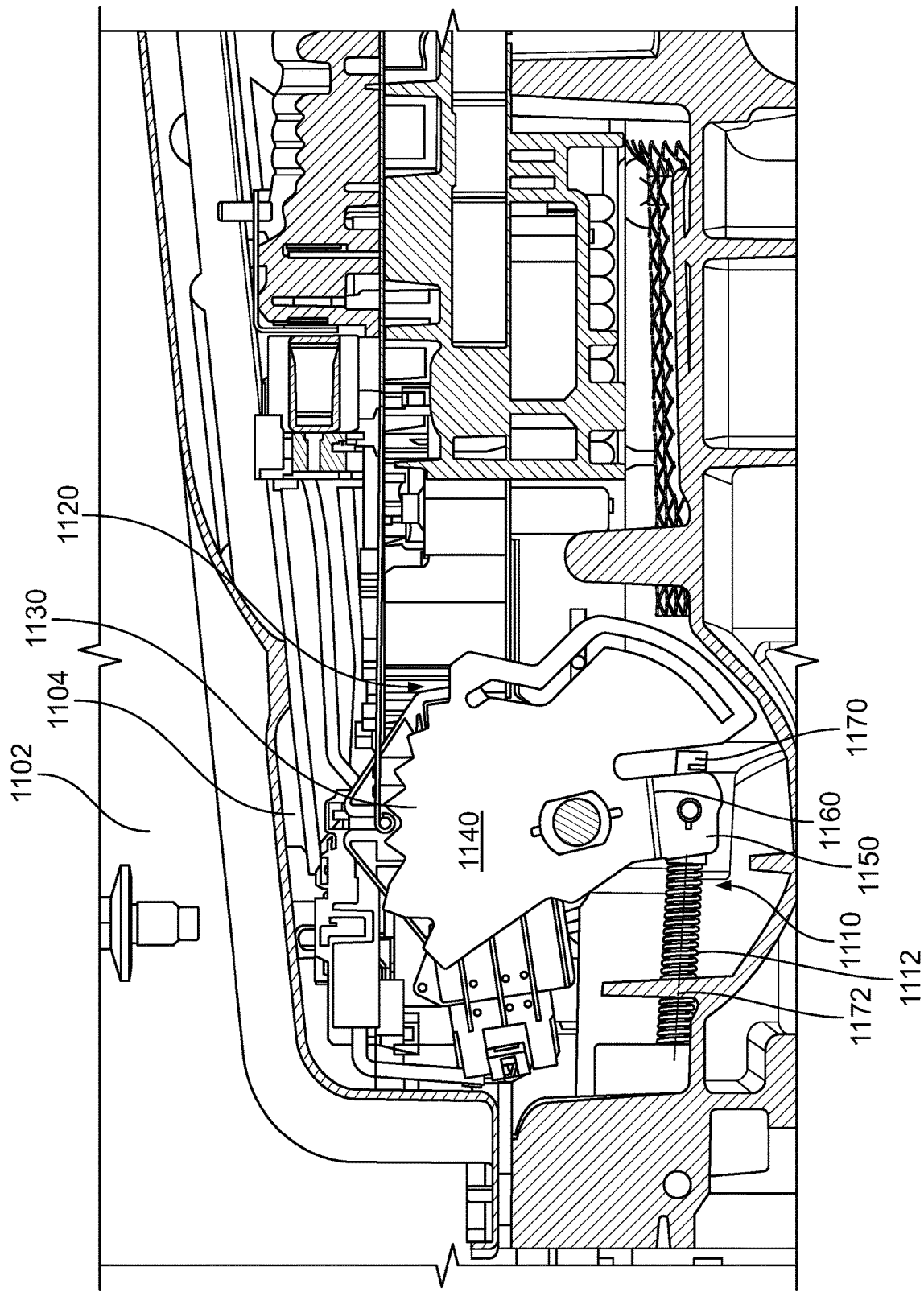
FIG. 11 is an elevation view of another actuation linkage adapted for inclusion in the drive system of FIG. 1.
Figure 12:
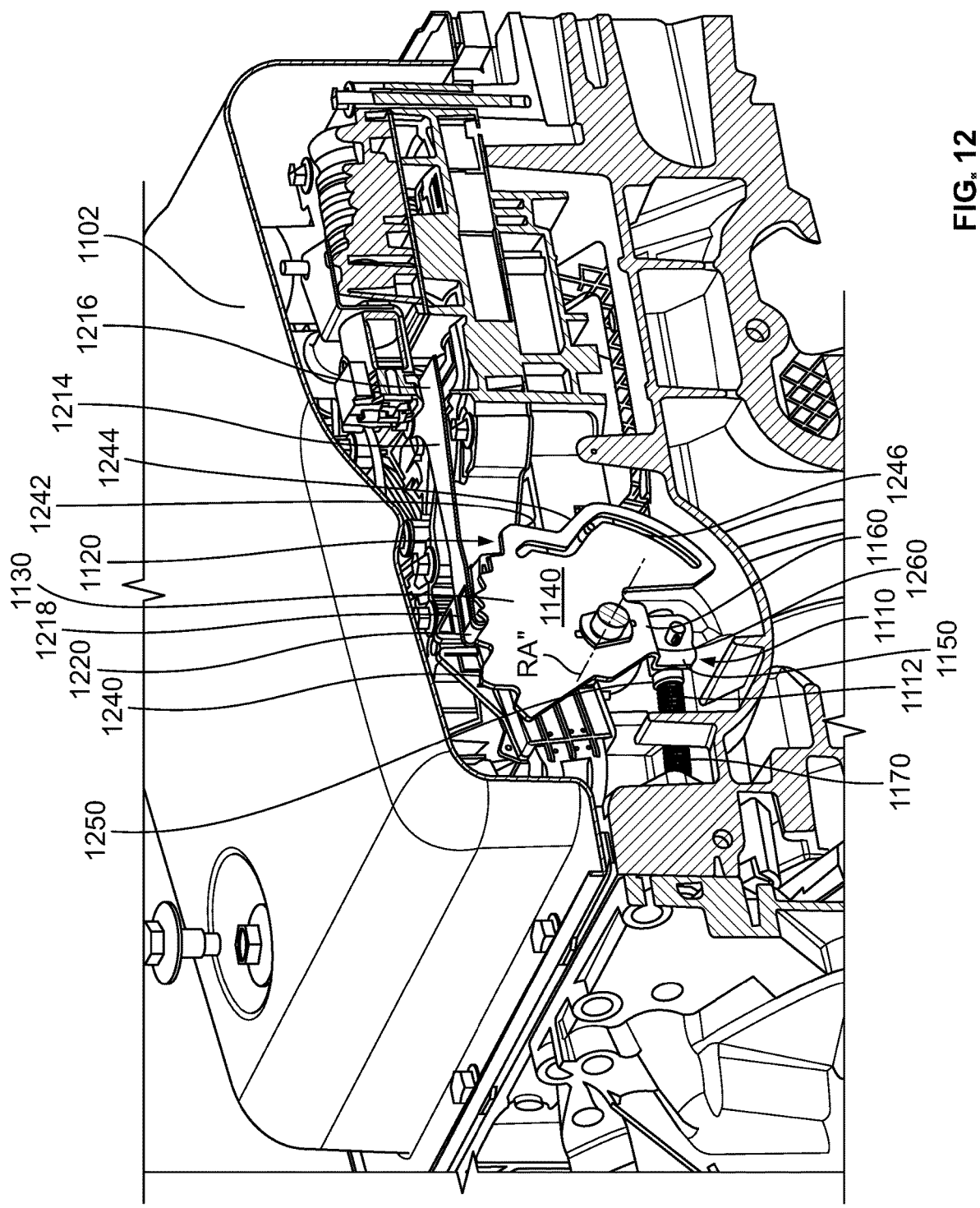
FIG. 12 is a perspective view of the actuation linkage of FIG. 11.

Referring now to FIGS. 11 and 12, an illustrative actuation linkage 1120 is adapted for use with a park gear assembly 1110 and an actuator (e.g., an actuator valve, solenoid, motor, or the like) to selectively brake a transmission output shaft of a drive system in one or more park operating modes or ranges. In some embodiments, the actuation linkage 1120 may be included in the park system 200 and employed in place of, or as an alternative to, the actuation linkage 230. In such embodiments, the plate 1130 described below may be utilized in place of, or as an alternative to, the plate 240 and configured for interaction with the actuator 220. Of course, in other embodiments, the actuation linkage 1120 may be included in another suitable park system.

The actuation linkage 1120 is illustratively supported by a housing 1102 and at least partially positioned in an interior space 1104 defined by the housing 1102. In some embodiments, the park gear assembly 1110 includes a gear, a park pawl, a plurality of rollers, and a ramp. In those embodiments, the rollers are operatively coupled to a rod 1170 of the actuation linkage 1120 that is adapted for translation along a longitudinal axis 1172.

The illustrative rod 1170 is coupled to a plate 1130 of the actuation linkage 1120, which includes a body 1140, a mount flange 1150, and a tab 1160 interconnecting the body 1140 and the mount flange 1150. The rod 1170 supports, and is at least partially surrounded by, a biasing element 1112. As best seen in FIG. 12, the mount flange 1150 supports a bracket 1250 that at least partially receives the rod 1170 and is arranged in contact with the biasing element 1112.

The illustrative actuation linkage 1120 includes a detent spring 1214 that is coupled to the plate 1130 and a stationary structure. More specifically, the detent spring 1214 includes an end 1216 that is coupled to a stationary structure (e.g., a stationary structure housed by the housing 1102) and an end 1218 that is coupled to a detent pin 1220. The detent pin 1220 is sized for positioning in one of a plurality of notches 1240 formed in the body 1140 of the plate 1130.

In the illustrative embodiment, the plurality of notches 1240 includes at least five notches. In some embodiments, the plurality of notches 1240 includes between five and seven notches. In any case, the notches 1240 are formed along an outer edge 1242 that defines an outer periphery 1244 of the body 1140. In the illustrative embodiment, the body 1140 is formed to include a slot 1246 disposed interiorly of the outer edge 1242. The illustrative slot 1246 has a zig-zag shape and/or a serpentine shape.

The body 1140 of the plate 1130 is illustratively adapted for rotation about a rotational axis RA". The notches 1240 are circumferentially spaced apart from one another about the rotational axis RA". The notches 1240 and the slot 1246 are circumferentially spaced apart from one another about the rotational axis RA".

In some embodiments, the bracket 1250 supported by the mount flange 1150 is adapted for sliding movement (e.g., linear translation) with the rod 1170 along the longitudinal axis 1172. Additionally, in some embodiments, the bracket 1250 is adapted for sliding movement relative to the rod 1170 along the longitudinal axis 1172. Additionally, in some embodiments still, the tab 1160 includes at least one bend 1260.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission comprising:
an input shaft to receive torque from a drive unit;
an output shaft to transmit torque to a load; and
a park system to selectively brake the output shaft, the park system including
a park gear assembly,
an actuator valve having a valve element axially translatable along a first longitudinal axis in response to one or more fluid pressures applied thereto,
an actuation linkage coupled between the actuator valve and the park gear assembly such that translation of the valve element along the first longitudinal axis drives operation of the park gear assembly through the actuation linkage in (i) an engaged state, in which the park system resists rotation of the output shaft, and (ii) a disengaged state, in which the park system permits rotation of the output shaft, and
a position sensor to generate a signal indicative of a position of the valve element along the first longitudinal axis in response to axial translation of the valve element along the first longitudinal axis,
wherein:
the actuation linkage includes a plate pivotally coupled to the valve element such that movement of the valve element along the first longitudinal axis causes rotation of the plate about a first rotational axis,
the plate includes a body that surrounds the first rotational axis and is formed to include a plurality of notches along an outermost edge thereof,
the plate includes a mount extension appended to the body that extends outwardly away from the body and is formed to include a slot that extends through one end thereof and is disposed between two mount arms pivotally coupled to the valve element,
the valve element of the actuator valve is formed to include a first annular groove at an outer periphery thereof and a second annular groove at the outer periphery, and
the first annular groove and the second annular groove are spaced from one another along the first longitudinal axis.

2. The transmission of claim 1, wherein:
the mount extension of the plate is pivotally coupled to the valve element of the actuator valve for rotation about a second rotational axis; and
the first rotational axis and the second rotational axis are spaced from one another in a direction parallel to the first longitudinal axis.

3. The transmission of claim 2, wherein the mount extension and the body of the plate define distinct structures spaced from one another in the direction.

4. The transmission of claim 1, wherein the actuation linkage includes a rod pivotally coupled to the body of the plate that is adapted for translation along a second longitudinal axis spaced from the first longitudinal axis.

5. The transmission of claim 4, wherein the first longitudinal axis is arranged parallel to the second longitudinal axis.

6. The transmission of claim 1, wherein:
the park system comprises a locking pin for positioning in the first annular groove or the second annular groove to block translation of the valve element along the first longitudinal axis;
when the park system is in the engaged state, the locking pin is positioned in one of the first annular groove and the second annular groove; and
when the park system is in the disengaged state, the locking pin is positioned in the other of the first annular groove and the second annular groove.

7. The transmission of claim 1, wherein the park system comprises a first pressure control solenoid to supply a first hydraulic fluid pressure to the actuator valve to drive operation of the park system in the engaged state.

8. The transmission of claim 7, wherein:
the park system comprises a second pressure control solenoid to supply a second hydraulic fluid pressure to the actuator valve to drive operation of the park system in the disengaged state; and
the first hydraulic fluid pressure is different from the second hydraulic fluid pressure.

9. A park system to selectively brake an output shaft of a transmission, the park system comprising:
a park gear assembly,
an actuator valve having a valve element axially translatable along a first longitudinal axis in response to one or more fluid pressures applied thereto, and
an actuation linkage coupled between the actuator valve and the park gear assembly such that translation of the valve element along the first longitudinal axis drives operation of the park gear assembly through the actuation linkage in (i) an engaged state, in which the park system resists rotation of the output shaft, and (ii) a disengaged state, in which the park system permits rotation of the output shaft,
wherein:
the actuation linkage includes a plate pivotally coupled to the valve element such that movement of the valve element along the first longitudinal axis causes rotation of the plate about a first rotational axis,
the plate includes a body that surrounds the first rotational axis and is formed to include a plurality of notches along an outermost edge thereof,
the plate includes a mount extension appended to the body that has a slot defined between two mount arms pivotally coupled to the valve element,
the plurality of notches and the slot are spaced from one another in a direction parallel to the first longitudinal axis, and
a pin is positioned in one of the plurality of notches formed in the body in each of the engaged and disengaged states of the park gear assembly.

10. The park system of claim 9, wherein:
the mount extension of the plate is pivotally coupled to the valve element of the actuator valve for rotation about a second rotational axis; and
the first rotational axis and the second rotational axis are spaced from one another in the direction.

11. The park system of claim 10, wherein the mount extension and the body of the plate define distinct structures spaced from one another in the direction.

12. The park system of claim 9, wherein the actuation linkage includes a rod pivotally coupled to the body of the plate that is adapted for translation along a second longitudinal axis spaced from the first longitudinal axis.

13. The park system of claim 12, wherein the first longitudinal axis is arranged parallel to the second longitudinal axis.

14. The park system of claim 9, further comprising a position sensor to generate a signal indicative of a position of the valve element along the first longitudinal axis.

15. The park system of claim 9, wherein:
the valve element of the actuator valve is formed to include a first annular groove at an outer periphery thereof and a second annular groove at the outer periphery; and
the first annular groove and the second annular groove are spaced from one another along the first longitudinal axis.

16. The park system of claim 15, wherein:
the park system comprises a locking pin for positioning in the first annular groove or the second annular groove to block translation of the valve element along the first longitudinal axis;
when the park system is in the engaged state, the locking pin is positioned in one of the first annular groove and the second annular groove; and
when the park system is in the disengaged state, the locking pin is positioned in the other of the first annular groove and the second annular groove.

17. The park system of claim 9, wherein:
the park system comprises (i) a first pressure control solenoid to supply a first hydraulic fluid pressure to the actuator valve to drive operation of the park system in the engaged state and (ii) a second pressure control solenoid to supply a second hydraulic fluid pressure to the actuator valve to drive operation of the park system in the disengaged state; and
the first hydraulic fluid pressure is different from the second hydraulic fluid pressure.

18. A park system to selectively brake an output shaft of a transmission, the park system comprising:
a park gear assembly,
an actuator valve having a valve element axially translatable along a first longitudinal axis in response to one or more fluid pressures applied thereto, and
an actuation linkage coupled between the actuator valve and the park gear assembly such that translation of the valve element along the first longitudinal axis drives operation of the park gear assembly through the actuation linkage in (i) an engaged state, in which the park system resists rotation of the output shaft, and (ii) a disengaged state, in which the park system permits rotation of the output shaft,
wherein:
the actuation linkage includes a plate pivotally coupled to the valve element such that movement of the valve element along the first longitudinal axis causes rotation of the plate about a first rotational axis,
the plate includes a body that surrounds the first rotational axis and is formed to include a plurality of notches along an outermost edge thereof,
the actuation linkage includes a rod pivotally coupled to the body of the plate that is adapted for translation along a second longitudinal axis spaced from the first longitudinal axis,
the first longitudinal axis is arranged parallel to the second longitudinal axis, and
a pin is positioned in one of the plurality of notches formed in the body in each of the engaged and disengaged states of the park gear assembly.

* * * * *